US012351065B2

(12) United States Patent
Choi et al.

(10) Patent No.: US 12,351,065 B2
(45) Date of Patent: Jul. 8, 2025

(54) METHOD FOR PROVIDING INFORMATION RELATED TO CHARGING OF VEHICLE BATTERY AND ELECTRONIC DEVICE SUPPORTING SAME

(71) Applicant: SAMSUNG ELECTRONICS CO., LTD., Suwon-si (KR)

(72) Inventors: Jinyoung Choi, Suwon-si (KR); Yongjun Lim, Suwon-si (KR); Joayoung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 234 days.

(21) Appl. No.: 18/077,548

(22) Filed: Dec. 8, 2022

(65) Prior Publication Data

US 2023/0182619 A1    Jun. 15, 2023

Related U.S. Application Data

(63) Continuation of application No. PCT/KR2022/018657, filed on Nov. 24, 2022.

(30) Foreign Application Priority Data

Dec. 9, 2021 (KR) .......... 10-2021-0175268
Dec. 17, 2021 (KR) .......... 10-2021-0181467

(51) Int. Cl.
*B60L 58/12*    (2019.01)
*B60L 1/00*    (2006.01)
(Continued)

(52) U.S. Cl.
CPC .......... *B60L 58/12* (2019.02); *B60L 1/00* (2013.01); *G01C 21/3469* (2013.01); *G01C 21/3679* (2013.01); *H04W 4/024* (2018.02)

(58) Field of Classification Search
CPC ....... B60L 58/12; B60L 1/00; G01C 21/3469; G01C 21/3679; H04W 4/024
(Continued)

(56) References Cited

U.S. PATENT DOCUMENTS

2010/0207772 A1* 8/2010 Yamamoto .......... B60L 53/14
340/636.2
2012/0306446 A1* 12/2012 Suganuma .......... B60L 53/30
701/119
(Continued)

FOREIGN PATENT DOCUMENTS

JP    2001-258177 A    9/2001
JP    2007-218715 A2    8/2007
(Continued)

OTHER PUBLICATIONS

International Search Report dated Mar. 2, 2023 for PCT/KR2022/018657.
PCT Written Opinion dated Mar. 2, 2023 for PCT/KR2022/018657.

*Primary Examiner* — Isaac G Smith
(74) *Attorney, Agent, or Firm* — Nixon & Vanderhye P.C.

(57) ABSTRACT

An electronic device may include a memory and at least one processor, wherein the at least one processor may be configured to acquire a current remaining battery level of a battery of a vehicle, information on at least one external electronic device operated by power provided from the battery, a current location of the vehicle, and a location of a destination to which the vehicle is to travel, determine the amount of power to be used while the vehicle travels to the destination, based on the information on the at least one external electronic device, the current location of the vehicle, and the location of the destination, and acquire information related to charging of the battery, based on the current remaining battery level and the determined amount of power.

16 Claims, 20 Drawing Sheets

(51) Int. Cl.
*G01C 21/34* (2006.01)
*G01C 21/36* (2006.01)
*H04W 4/024* (2018.01)

(58) Field of Classification Search
USPC .......................................................... 701/25
See application file for complete search history.

(56) References Cited

U.S. PATENT DOCUMENTS

| | | |
|---|---|---|
| 2013/0127244 A1 | 5/2013 | Handa |
| 2015/0032315 A1 | 1/2015 | Kinomura et al. |
| 2015/0134167 A1 | 5/2015 | Won et al. |
| 2017/0352082 A1* | 12/2017 | Aziz ...................... G06Q 50/40 |
| 2020/0139845 A1* | 5/2020 | Henrichs ................. H04L 12/40 |
| 2021/0053460 A1 | 2/2021 | Oh et al. |
| 2021/0180967 A1 | 6/2021 | Chae et al. |
| 2022/0080854 A1* | 3/2022 | Salter ...................... B60L 58/12 |

FOREIGN PATENT DOCUMENTS

| | | |
|---|---|---|
| JP | 2010-210271 A | 9/2010 |
| JP | 2012-244784 A2 | 12/2012 |
| JP | 2013-107519 A | 6/2013 |
| JP | 2014-87228 A2 | 5/2014 |
| JP | 2015-073369 A | 4/2015 |
| JP | 2015-190849 A2 | 11/2015 |
| JP | 2016015825 A * | 1/2016 |
| KR | 10-2012-0088162 | 8/2012 |
| KR | 10-2020-0072295 A | 6/2020 |
| KR | 10-2138572 B1 | 7/2020 |
| KR | 10-2020-0117721 A | 10/2020 |
| KR | 10-2172072 B1 | 10/2020 |
| KR | 10-2021-0023056 A | 3/2021 |
| KR | 10-2021-0075594 A | 6/2021 |
| WO | WO 2013/124978 A1 | 8/2013 |

* cited by examiner

METHOD FOR PROVIDING INFORMATION RELATED TO CHARGING OF VEHICLE BATTERY AND ELECTRONIC DEVICE SUPPORTING SAME

CROSS-REFERENCE TO RELATED APPLICATIONS

This application is a continuation of International Application No. PCT/KR2022/018657, filed Nov. 24, 2022, designating the United States, in the Korean Intellectual Property Receiving Office, and claiming priority to KR Patent Application No. 10-2021-0175268, filed Dec. 9, 2021, and to KR Patent Application No. 10-2021-0181467, filed Dec. 17, 2021, the disclosures of which are all hereby incorporated by reference herein in their entireties.

BACKGROUND

Field

Various example embodiments relate to a method for providing information related to charging of a vehicle battery and an electronic device supporting the same.

Description of Related Art

Recently, the popularization of electric vehicles is accelerating due to the expansion of electric vehicle charging infrastructure and purchase subsidy policies, and the reinforcement of policies to eliminate internal combustion vehicles by governments around the world. While overseas travel is decreasing due to the prolonged COVID-19, as non-face-to-face outdoor activities increase, the demand for camping using electric vehicles is increasing.

A vehicle-to-load (V2L) function may refer to a technology that allows the battery power of an electric vehicle to be used outside. Users may use a variety of high-output electronic devices (e.g., home appliances) outdoors (e.g., camping) by using a V2L function of an electric vehicle.

SUMMARY

When using an electronic device by using a V2L function of an electric vehicle, a user should frequently check the remaining battery level of the electric vehicle, which may cause a burden on using electricity due to concerns about discharging. For example, an electric vehicle may use electric power to travel to a destination, and may supply electric power to an electronic device by using a V2L function while staying at the destination. To prevent, or reduce the amount of, a battery of an electric vehicle from being discharged while traveling to or staying at a destination, it is necessary to continuously check the remaining battery level of the electric vehicle, and if the battery level of the electric vehicle seems to be low, it is necessary to charge the electric vehicle battery in advance.

Various example embodiments may relate to a method for providing information on charging of a vehicle battery and an electronic device supporting the same, in which the amount of power to be used by a vehicle and/or an electronic device using a V2L function while the vehicle (e.g., the electric vehicle) is traveling to and/or staying at a destination is determined, and information (e.g., information for guidance of a charging time and a charging station for charging the vehicle battery) on charging of the vehicle battery is provided based on the determined amount of power.

Technical tasks to be achieved in the disclosure are not limited to the aforementioned technical tasks, and other technical tasks that are not mentioned may be clearly understood by those skilled in the art related to the document on the basis of the following descriptions.

An electronic device according to various example embodiments may include a memory and at least one processor, wherein the at least one processor may be configured to acquire a current remaining battery level of a battery of a vehicle, information on at least one electronic device operated by power provided from the battery, a current location of the vehicle, and a location of a destination to which the vehicle is to travel, determine an amount of power to be used while the vehicle travels to the destination, based on the information on the at least one electronic device, the current location of the vehicle, and the location of the destination, and acquire information related to charging of the battery, based on the current remaining battery level and the determined amount of power.

A method for providing information related to charging of a vehicle battery by an electronic device according to various example embodiments may include acquiring a current remaining battery level of a battery of a vehicle, information on at least one electronic device operated by power provided from the battery, a current location of the vehicle, and a location of a destination to which the vehicle is to travel, determining an amount of power to be used while the vehicle travels to the destination, based on the information on the at least one electronic device, the current location of the vehicle, and the location of the destination, and acquiring information related to charging of the battery, based on the current remaining battery level and the determined amount of power.

A server according to various example embodiments may include a communication module and at least one processor, wherein the at least one processor may be configured to acquire, via the communication module from a first external electronic device, a current remaining battery level of a battery of a vehicle, information on at least one second electronic device operated by power provided from the battery, a current location of the vehicle, and a location of a destination to which the vehicle is to travel, determine an amount of power to be used while the vehicle travels to the destination, based on the information on the at least one second electronic device, the current location of the vehicle, and the location of the destination, and acquire information related to charging of the battery, based on the current remaining battery level and the determined amount of power.

In a method for providing information related to charging of a vehicle battery and/or an electronic device supporting the same according to various example embodiments, the amount of power to be used by a vehicle and/or an electronic product using a V2L function while the vehicle (e.g., the electric vehicle) is traveling to and/or staying at a destination can be determined, and information (e.g., information for guidance of a charging time and a charging station for charging the vehicle battery) on charging of the vehicle battery can be provided based on the determined amount of power. Based on this, discharging of a vehicle battery at a time unexpected by a user can be minimized or reduced.

BRIEF DESCRIPTION OF DRAWINGS

The above and other aspects, features, and advantages of certain example embodiments will be more apparent from the following detailed description, taken in conjunction with the accompanying drawings, in which.

DETAILED DESCRIPTION

Figure 1:
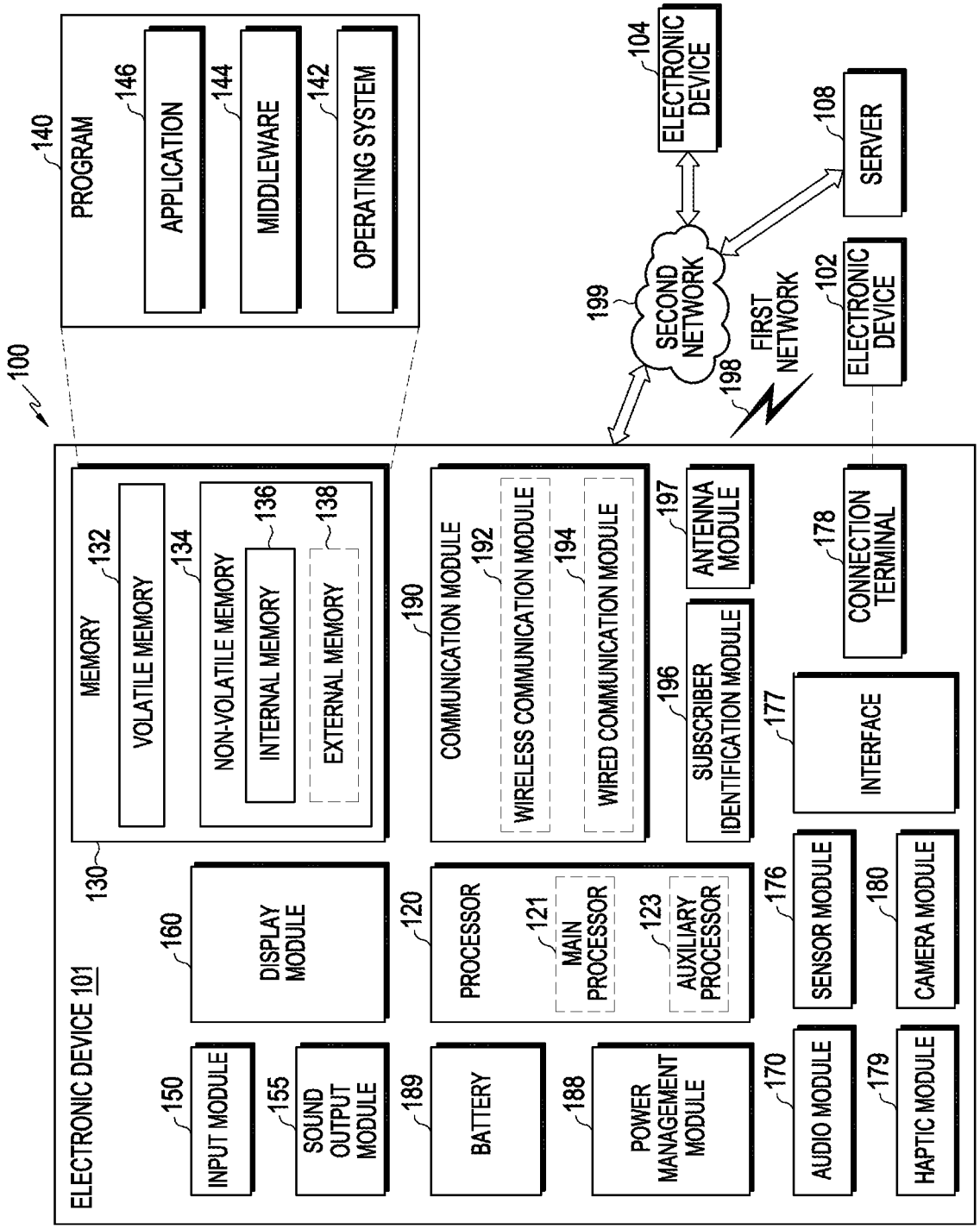
FIG. 1 is a block diagram of an electronic device in a network environment according to various example embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via at least a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
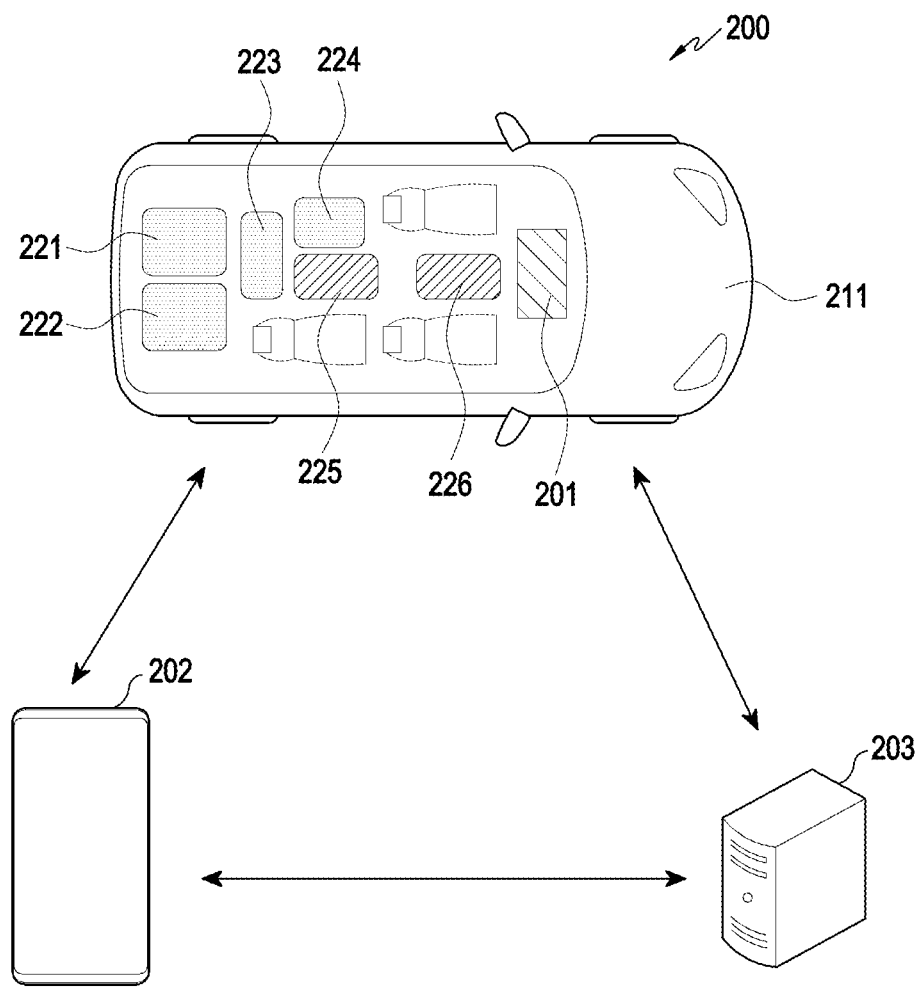
FIG. 2 is a diagram illustrating a system for providing information related to charging of a vehicle battery according to various example embodiments.

FIG. 2 is a diagram illustrating a system 200 for providing information related to charging of a vehicle battery according to various embodiments.

Referring to FIG. 2, in an embodiment, the system 200 may include a vehicle 211, a first electronic device 201 disposed in the vehicle 211, at least one external electronic device 221, 222, 223, 224, 225 and 226 which may use power supplied from a battery of the vehicle 211, a second electronic device 202, and/or a server 203.

In an embodiment, the vehicle 211 may include a battery (not shown) and elements that enable the vehicle 211 to travel. In an embodiment, the vehicle 211 may be an electric vehicle capable of supporting a V2L function by using a battery. For example, the vehicle 211 may supply power from the battery to the at least one external electronic device 221, 222, 223, 224, 225 and 226 (and the first electronic device 201) by using the V2L function.

In an embodiment, the first electronic device 201 may perform at least some operations for providing information on charging of the vehicle battery. In an embodiment, the first electronic device 201 may include an in-vehicle infotainment (IVI) system included in the vehicle 211.

In an embodiment, the at least one external electronic device 221, 222, 223, 224, 225 and 226 may include a device (e.g., in-vehicle appliances (IVA)) which may use power supplied from the battery of the vehicle 211. In an embodiment, the at least one external electronic device may include external electronic devices 225 and 226 fixedly disposed on the vehicle 211 and external electronic devices 221, 222, 223, and 224 detachably disposed on the vehicle 211. For example, the at least one external electronic device may include an external electronic device fixedly disposed on the vehicle 211, such as a console cup holder and/or a console refrigerator. For another example, the at least one external electronic device may include an external electronic device detachable from the vehicle 211, such as a smart monitor, a trunk refrigerator, a trunk oven, a smart speaker, and/or a dryer. However, the at least one external electronic device is not limited to the above-described examples, and may include all devices operable using power supplied from the battery by using the V2L function.

In an embodiment, the at least one external electronic device may include one or more home appliances.

In an embodiment, the second electronic device 202 may include a portable communication device (e.g., a smartphone). In an embodiment, the second electronic device 202 may perform some operations for providing information on charging of the vehicle battery. For example, the second electronic device 202 may receive schedule information (e.g., information input by a user for travel) from the user. The second electronic device 202 may transmit schedule information to the first electronic device 201 and/or the server 203.

In an embodiment, the server 203 may perform some operations for providing information on charging of the vehicle battery, based on information received from the first electronic device 201, the at least one external electronic device, and/or the second electronic device 202. In an embodiment, the server 203 may include a server (e.g., a server that manages at least one electronic device by using smart things) capable of managing at least one electronic device (e.g., the first electronic device 201, the second electronic device 202, and/or the at least one external electronic device) registered in the server 203.

In an embodiment, although not illustrated in FIG. 2, the system 200 may further include, as the first electronic device 201 (or the server 203 or the first electronic device 201), a server (e.g., a server that manages a charging station) that provides information on a charging station (e.g., a charging price and a waiting situation of vehicles for charging). In an embodiment, although not illustrated in FIG. 2, the system 200 may further include a server (e.g., a navigation server) that provides information (e.g., an optimal route to travel to a destination, a distance from an origin to the destination, and/or an estimated time for the vehicle 211 to arrive at the destination) related to driving of the vehicle 211. In an embodiment, a navigation server may be included in the server 203.

Referring to the following drawings, the vehicle 211, the first electronic device 201, the at least one external electronic device 221, 222, 223, 224, 225 and 226, the second electronic device 202, and/or the server 201, which are included in the system, will be described in more detail.

Figure 3:
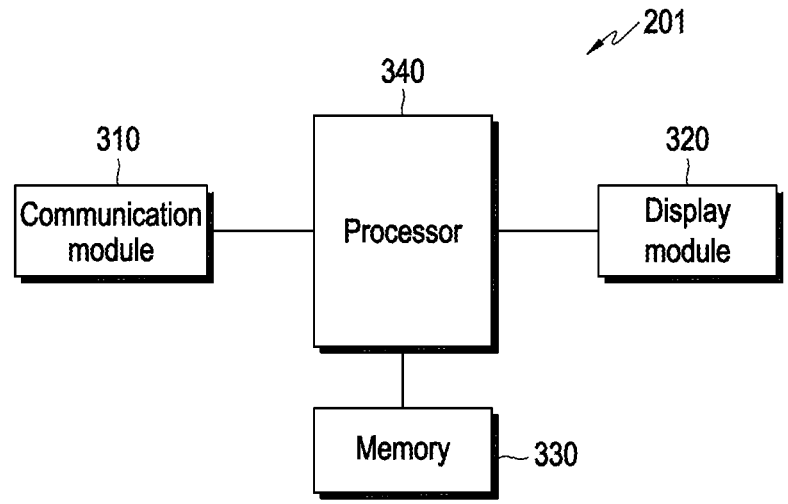
FIG. 3 is a block diagram of a first electronic device according to various example embodiments.

FIG. 3 is a block diagram of the first electronic device 201 according to various embodiments.

Referring to FIG. 3, in an embodiment, the first electronic device 201 may include a communication module 310, a display module 320, a memory 330, and/or a processor 340.

In an embodiment, the communication module 310 may be included in the communication module 190 of FIG. 1.

In an embodiment, the communication module 310 may enable the first electronic device 201 to communicate with the at least one external electronic device 221, 222, 223, 224, 225 and 226, the second electronic device 202, the server 203, a server that manages a charging station, and/or a navigation server.

In an embodiment, the display module 320 may be included in the display module 160 of FIG. 1.

In an embodiment, the display module 320 may include a center information display (CID) that indicates states of elements included in the vehicle 211 and displays a screen for controlling of operations of the elements included in the vehicle 211.

In an embodiment, the memory 330 may be included in the memory 130 of FIG. 1.

In an embodiment, the memory 330 may store information for performing of at least some operations of providing information on charging of the battery of the vehicle 211. Information on charging of the vehicle battery, which is stored in the memory 330, will be described later.

In an embodiment, the processor 340 may be included in the processor 120 of FIG. 1.

In an embodiment, the processor 340 may control overall operations of providing information on charging of the vehicle battery. In an embodiment, the processor 340 may include one or more processors for performing an operation of providing information on charging of the vehicle battery. The operation performed by the processor 340 to provide information on charging of the vehicle battery will be described below in detail with reference to FIG. 6.

In an embodiment, in FIG. 3, although it is illustrated that the first electronic device 201 includes the communication module 310, the display module 320, the memory 330, and/or the processor 340, the disclosure is not limited thereto. For example, the first electronic device 201 may further include at least one element (e.g., the input module 150, the sound output module 155, and the power management module 188) included in the electronic device 101 of FIG. 1.

Figure 4:
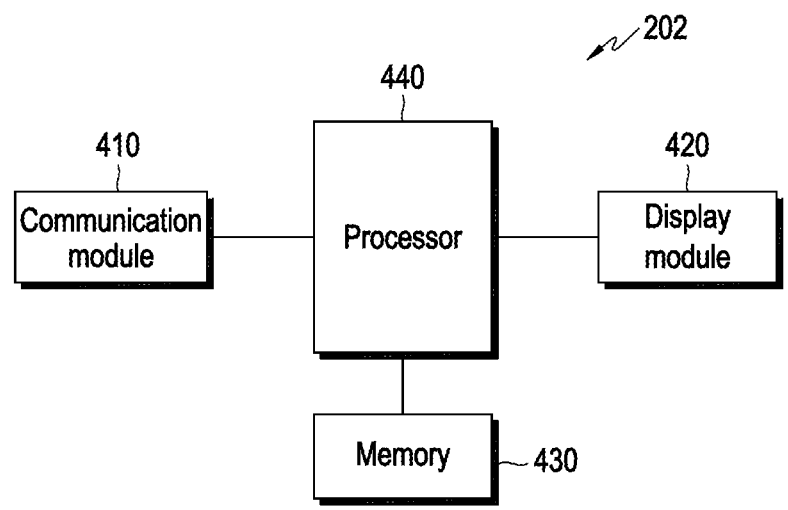
FIG. 4 is a block diagram of a second electronic device according to various example embodiments.

FIG. 4 is a block diagram of the second electronic device 202 according to various embodiments.

Referring to FIG. 4, in an embodiment, the second electronic device 202 may include a communication module 410, a display module 420, a memory 430, and/or a processor 440.

In an embodiment, the communication module 410 may be included in the communication module 190 of FIG. 1.

In an embodiment, the communication module 410 may enable the second electronic device 202 to communicate with the at least one external electronic device 221, 222, 223, 224, 225 and 226, the first electronic device 201, the server 203, a server that manages a charging station, and/or a navigation server.

In an embodiment, the display module 420 may be included in the display module 160 of FIG. 1.

In an embodiment, the memory 430 may be included in the memory 130 of FIG. 1.

In an embodiment, the memory 430 may store information for performing of at least some operations of providing information on charging of the vehicle battery. Information on charging of the vehicle battery, which is stored in the memory 430, will be described later.

In an embodiment, the processor 440 may be included in the processor 120 of FIG. 1.

In an embodiment, the processor 440 may perform some operations of providing information on charging of the vehicle battery. In an embodiment, the processor 440 may include one or more processors for performing an operation of providing information on charging of the vehicle battery. In an embodiment, the processor 440 may perform at least some operations performed by the first electronic device 201. In an embodiment, the processor 440 may transmit information on operations performed by the second electronic device 202 to the first electronic device 201 (or the server 203) via the communication module. For example, when schedule information (e.g., information input for travel by a user) is acquired based on a user input, the processor 440 may transmit the acquired schedule information to the first electronic device 201 (or the server 203) via the communication module.

In an embodiment, in FIG. 4, although it is illustrated that the second electronic device 202 includes the communication module 410, the display module 420, the memory 430, and/or the processor 440, the disclosure is not limited thereto. For example, the second electronic device 202 may further include at least one element (e.g., the input module 150 and the sound output module 155) included in the electronic device 101 of FIG. 1.

Each embodiment herein may be used in combination with any other embodiment(s) described herein.

Figure 5:
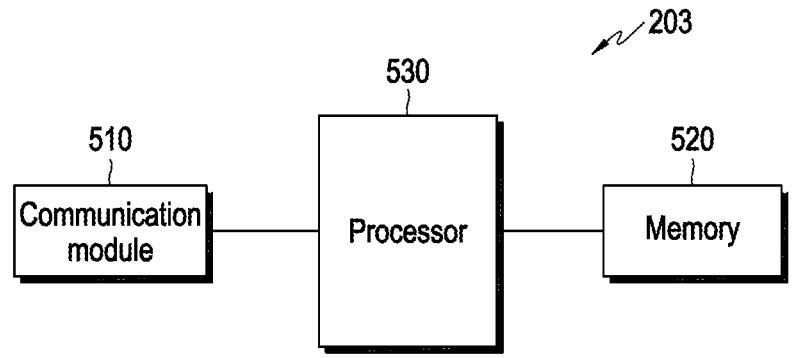
FIG. 5 is a block diagram of a server, according to various example embodiments.

FIG. 5 is a block diagram of the server 203 according to various embodiments.

Referring to FIG. 5, the server 203 may include a communication module 510 and/or a memory 520.

In an embodiment, the communication module 510 may enable the server 203 to communicate with the first electronic device 201, the at least one external electronic device 221, 222, 223, 224, 225 and 226, the second electronic device 202, a server that manages a charging station, and/or a navigation server.

In an embodiment, the memory 520 may be included in the memory 130 of FIG. 1.

In an embodiment, the memory 520 may store information for performing at least some operations of providing information on charging of the vehicle battery. The operation of providing information on charging of the vehicle battery, which is stored in the memory 520, will be described later.

In an embodiment, the processor 530 may perform some operations of providing information on charging of the vehicle battery. In an embodiment, the processor 530 may include one or more processors for performing an operation of providing information on charging of the vehicle battery. In an embodiment, the processor 530 may perform at least some operations performed by the first electronic device 201.

Although not described with reference to FIG. 2 to FIG. 5, in an embodiment, the at least one external electronic device 221, 222, 223, 224, 225 and 226 may include at least one element included in the electronic device 101 of FIG. 1. In an embodiment, the at least one external electronic device may transmit information on the at least one external electronic device to the first electronic device 201, the second electronic device 202, and/or the server 203.

In an embodiment, the at least one external electronic device may calculate the amount of power consumption (e.g., the amount of power being used in real time) of the at least one external electronic device, and may display the same via the display module included in the at least one external electronic device. In an embodiment, the at least one external electronic device may calculate the amount of power required to complete a currently performed operation, and may display the same via the display module included in the at least one external electronic device.

An electronic device (e.g., the first electronic device 201) according to various embodiments may include the memory 330 and at least one processor (e.g., the processor 340), wherein the at least one processor is configured to acquire a current remaining battery level of the battery of the vehicle, information on at least one external electronic device 221, 222, 223, 224, 225 and 226 operated by power provided from the battery, a current location of the vehicle, and a location of a destination to which the vehicle is to travel, determine an amount of power to be used while the vehicle travels to the destination, based on the information on the at least one external electronic device, the current location of the vehicle, and the location of the destination, and acquire information related to charging of the battery, based on the current remaining battery level and the determined amount of power.

In various embodiments, the information on the at least one external electronic device may include a type, state, and/or power consumption of the at least one external electronic device.

In various embodiments, the at least one external electronic device may include one or more home appliances.

In various embodiments, the at least one processor may be configured to determine the amount of power required for the vehicle to travel from the current location to the destination and the amount of power to be used by the at least one external electronic device while the vehicle travels from the current location to the destination, based on the information on the at least one external electronic device, the current location of the vehicle, and the location of the destination, and determine the amount of power to be used while the vehicle travels to the destination, by summing the amount of power required for the vehicle to travel from the current location to the destination and the amount of power to be used by the at least one external electronic device while the vehicle travels from the current location to the destination.

In various embodiments, the at least one processor may be configured to acquire guidance information for charging the battery of the vehicle before the vehicle arrives at the destination if the determined amount of power is higher than the current remaining battery level, and the guidance information may include information on a charging station for charging the battery of the vehicle.

In various embodiments, the at least one processor may be further configured to acquire information on a schedule, and determine, based on past use data of the at least one external electronic device, the amount of power to be used by the at least one external electronic device during a schedule time determined based on the schedule, and the at least one processor is configured to acquire the information related to the charging of the battery, based on the current remaining battery level, the amount of power to be used while the vehicle travels to the destination, and the amount of power to be used by the at least one external electronic device during the schedule time.

In various embodiments, the at least one processor may be further configured to determine the amount of power to be used while the vehicle travels from the location of the destination to a charging station for charging of the battery of the vehicle, and the at least one processor may be configured to acquire the information related to the charging of the battery, based on the current remaining battery level, the amount of power to be used while the vehicle travels to the destination, the amount of power to be used by the at least one external electronic device during the schedule time, and the amount of power to be used while the vehicle travels from the location of the destination to the charging station.

In various embodiments, the at least one processor may be further configured to acquire information on a schedule, determine, based on past use data of the at least one external electronic device, the amount of power to be used by the at least one external electronic device from a current time point to a point in time when the schedule is completed, and determine the amount of power to be used while the vehicle travels from the current location to a charging station for charging the battery of the vehicle, and the at least one processor may be configured to, as a part of acquiring the information on charging of the battery, acquire the information on charging of the battery, based on the current remaining battery level, the amount of power to be used while the vehicle travels to the destination, the amount of power to be used by the at least one external electronic device from the current time point to the point in time when the schedule is completed, and the amount of power to be used while the vehicle travels from the location of the destination to the charging station.

In various embodiments, the at least one processor may be configured to acquire a point in time when the battery of the vehicle needs to be charged and/or a point in time when the vehicle is to depart from the current location of the vehicle or the location of the destination to a location of a charging station for charging the battery of the vehicle in order to charge the battery of the vehicle.

The server 203 according to various embodiments may include the communication module 510 and at least one processor (e.g., the processor 530), wherein the at least one processor is configured to acquire, via the communication module from a first external electronic device (e.g., the first electronic device 201 or the second electronic device 202), a current remaining battery level of the battery of the vehicle, information on at least one second external electronic device operated by power provided from the battery, a current location of the vehicle, and a location of a destination to which the vehicle is to travel, determine an amount of power to be used while the vehicle travels to the destination, based on the information on the at least one second external electronic device, the current location of the vehicle, and the location of the destination, and acquire information related to charging of the battery, based on the current remaining battery level and the determined amount of power.

In various embodiments, the information on the at least one second external electronic device may include a type, state, and/or power consumption of the at least one second external electronic device.

Figure 6:
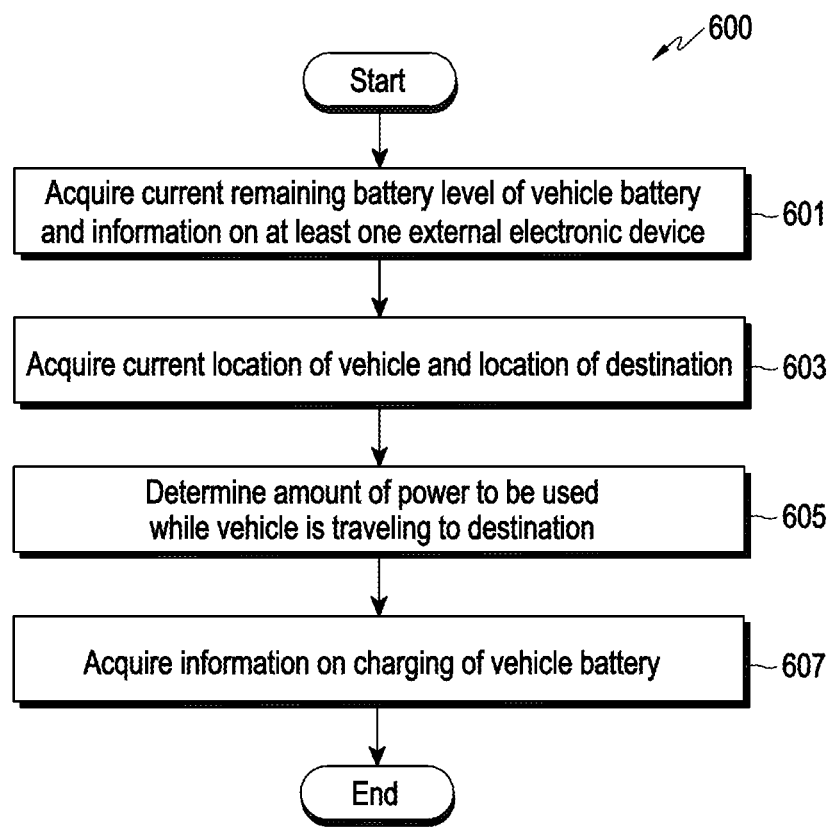
FIG. 6 is a flowchart illustrating a method for providing information related to charging a vehicle battery according to various example embodiments.

FIG. 6 is a flowchart 600 illustrating a method for providing information related to charging of a vehicle battery according to various embodiments.

In an embodiment, FIG. 6 may be a diagram to describe operations performed by the first electronic device 201 before a vehicle (e.g., the vehicle 211) travels from an origin to a destination or while the vehicle is traveling to the destination.

Referring to FIG. 6, in operation 601, in an embodiment, the processor 340 may acquire a current remaining battery level of the vehicle battery (hereinafter, the vehicle battery is also referred to as "battery") and information on at least one external electronic device.

In an embodiment, the processor 340 may acquire the current remaining battery level from a battery management system (BMS) included in the vehicle. In an embodiment, the processor 340 may acquire, from the battery management system, the current remaining battery level in real time (or periodically).

In an embodiment, when the vehicle (or the first electronic device 201) enters a mode for performing a V2L function, based on a user input or a designated configuration, the processor 340 may start an operation of acquiring the current remaining battery level from the battery management system.

In an embodiment, when the vehicle is started, the processor 340 may start the operation of acquiring the current remaining battery level from the battery management system.

In an embodiment, the processor 340 may acquire, via the communication module 310 from the at least one external electronic device, information on the at least one external electronic device, which includes a type (e.g., an identity (ID) of the at least one external electronic device), state (e.g., whether the at least one external electronic device is in an on/off state and whether the at least one external electronic device is in a lower power mode), and/or power consumption (e.g., currently used power and rated power consumption) of the at least one external electronic device. However, information on the at least one external electronic device is not limited to the aforementioned examples. For example, information on the at least one external electronic device may include all information related to power of the at least one external electronic device.

In an embodiment, the at least one external electronic device may include one or more home appliances.

In an embodiment, the processor 340 may acquire information on the at least one external electronic device via the communication module 310 from the at least one external electronic device at a point in time when the at least one external electronic device is connected to (or mounted on) the vehicle and/or a point in time when the vehicle (e.g., the first electronic device 201) enters a mode for performing the V2L function. The point in time when the processor 340 acquires information on the at least one external electronic device from the at least one external electronic device is not limited to the aforementioned example. For example, at a point in time when the vehicle is started or when a user gets into the vehicle, the processor 340 may acquire information on the at least one external electronic device from the at least one external electronic device.

In an embodiment, the processor 340 may control the at least one external electronic device to operate, based on user information (e.g., user profile information). For example, the processor 340 may configure the at least one external electronic device, based on a user input. The processor 340 may store the configuration of the at least one external electronic device in the memory 330. The processor 340 may select a user from among one or more users, based on the user input at the point in time when the vehicle is started or when the user gets into the vehicle. The processor 340 may identify the configuration of the at least one external electronic device, which corresponds to the selected user. The processor 340 may control the at least one external electronic device so that the at least one external electronic device operates according to the identified configuration.

In operation 603, in an embodiment, the processor 340 may acquire a current location of the vehicle and a location of a destination.

In an embodiment, the processor 340 may acquire the current location of the vehicle (e.g., the first electronic device 201) via a global navigation satellite system (GNSS) communication module (or a global positioning system (GPS) communication module) included in the first electronic device 201 (or the vehicle). In an embodiment, the processor 340 may acquire the current location of the vehicle from the second electronic device 202 via the communication module 310. However, the method by which the processor 340 acquires the current location of the vehicle is not limited to the aforementioned examples, and the current location of the vehicle may be acquired based on information received from various external electronic devices located around the vehicle.

In an embodiment, the current location of the vehicle may include a location in which the vehicle departs before the vehicle travels toward the destination or a location in which the vehicle is located while the vehicle is traveling towards the destination. For example, the current location of the vehicle may include, when the vehicle is to travel to the destination (e.g., a travel destination) from the user's house, a location in which the vehicle is located on a driving route via which the vehicle travels to the destination or a location of the user's house. As another example, the current location of the vehicle may include, when the vehicle is to travel to the destination (e.g., the user's house) from the travel destination, a location in which the vehicle is located on a driving route via which the vehicle travels to the location of the travel destination or the destination.

In an embodiment, the processor 340 may acquire the location of the destination, based on the user input. For example, the processor 340 may receive the destination (e.g., a place or an address) from the user while a navigation application is being executed in the first electronic device 201. The processor 340 may acquire the location of the destination from the input destination by using the navigation application. As another example, the processor 340 may receive the location of the destination input via the second electronic device 202, through the communication module

310 from the second electronic device 202, thereby acquiring the location of the destination.

In an embodiment, the processor 340 may acquire the location of the destination, based on schedule information. For example, the processor 340 may acquire schedule information including the destination and a travel date from the second electronic device 202 via the communication module 310 or the memory 330 of the first electronic device 201. The processor 340 may acquire the location of the destination, based on the destination included in the schedule information.

In an embodiment, the processor 340 may configure a route (e.g., a driving route of the vehicle) from the current location of the vehicle to the location of the destination via the navigation application, based on the current location of the vehicle and the location of the destination. For example, the processor 340 may configure a route including a shortest distance between the current location of the vehicle and the location of the destination and/or a route that enables the vehicle to reach the location of the destination from the current location within a shortest time. However, the method by which the processor 340 configures a route, based on the current location of the vehicle and the location of the destination, is not limited to the aforementioned example.

In operation 605, in an embodiment, the processor 340 may determine the amount of power to be used while the vehicle is traveling to the destination, based on information on the at least one external electronic device, the current location of the vehicle, and the location of the destination.

In an embodiment, the processor 340 may determine (e.g., estimate) power required for the vehicle to travel to the destination, based on the current location of the vehicle and the location of the destination. For example, when the route including the shortest distance between the current location of the vehicle and the location of the destination is configured, the processor 340 may acquire the shortest distance and the estimated driving time (e.g., when the vehicle travels on the route including the shortest distance, the estimated time it takes to reach the destination location from the current location of the vehicle) by using the navigation application. The processor 340 may determine power required for the vehicle to travel to the destination, based on the shortest distance and an average fuel efficiency (also referred to as "fuel efficiency") of the vehicle (e.g., by dividing the shortest distance by the average fuel efficiency of the vehicle).

In an embodiment, the average fuel efficiency of the vehicle may be configured for each user of the vehicle. For example, the processor 340 may cumulatively store, in the memory 330, a driving distance of the vehicle and the amount of power used for driving of the vehicle for each user (e.g., a driver of the vehicle). The processor 340 may calculate, for each user, the average fuel efficiency of the vehicle, which corresponds to a user, by dividing the cumulative driving distance of the vehicle by the amount of power used for vehicle driving. The processor 340 may identify the average fuel efficiency of the vehicle, which corresponds to a user, by identifying the user (e.g., user information). However, the disclosure is not limited thereto, and the average fuel efficiency of the vehicle may be calculated by dividing the total driving distance of the vehicle by the total amount of power used for driving of the vehicle, regardless of a user who uses the vehicle.

In an embodiment, the processor 340 may determine the amount of power to be used by the at least one external electronic device while the vehicle is traveling to the destination, based on the estimated driving time and information on the at least one external electronic device. For example, the processor 340 may determine the amount of power to be used by the at least one external electronic device while the vehicle is traveling from the current location to the destination, by performing multiplication of the estimated driving time and power consumption (e.g., the sum of power consumption currently used by all of the at least one external electronic device) of the at least one external electronic device.

In an embodiment, the processor 340 may determine the amount of power to be used while the vehicle is traveling from the current location to the destination, by summing the power required for the vehicle to travel to the destination and the amount of power to be used by the at least one external electronic device while the vehicle is traveling from the current location to the destination.

In operation 607, in an embodiment, the processor 340 may acquire information on charging of the vehicle battery, based on the current remaining battery level of the vehicle battery and the amount of power to be used while traveling from the current location to the destination.

In an embodiment, the processor 340 may provide the acquired information on battery charging of the vehicle.

In an embodiment, the processor 340 may compare the current remaining battery level of the vehicle battery with the amount of power to be used while traveling from the current location to the destination. If the amount of power to be used while traveling from the current location to the destination is greater than the current remaining battery level of the vehicle battery, the processor 340 may display, via the display module 320, information for guiding to charge the vehicle battery before the vehicle arrives at the destination. For example, if the amount of power to be used while traveling from the current location to the destination is greater than the current remaining battery level of the vehicle battery, the processor 340 may display, via the display module 320, information indicating that the battery of the vehicle needs to be charged before arriving at the destination. For another example, if the amount of power to be used while traveling from the current location to the destination is greater than the current remaining battery level of the vehicle battery, the processor 340 may acquire information (e.g., a location of a charging station and a waiting situation of the charging station) on a charging station for charging of the vehicle battery, and may display, via the display module 320, information (e.g., a route between the current location of the vehicle and the location of the charging station) for guiding the vehicle to travel to the charging station, based on the acquired information on the charging station. The aforementioned examples illustrate that information for guiding the vehicle to charge the vehicle battery before arriving at the destination is displayed via the display module 320, but is not limited thereto. For example, the processor 340 may output, in an audio form via a sound output module (e.g., a speaker), the information for guiding the vehicle to charge the vehicle battery before the vehicle arrives at a destination.

In an embodiment, if the amount of power to be used while traveling from the current location to the destination is equal to or less than the current remaining battery level of the vehicle battery, the processor 340 may repeatedly perform at least some of operations 601 to 607.

In an embodiment, if the amount of power to be used while traveling from the current location to the destination is greater than the current remaining battery level of the vehicle battery, the processor 340 may transmit the guidance information to the first electronic device 201 via the communication module 310 so that the first electronic device 201 outputs the information for guiding the vehicle to charge the vehicle battery before arriving at the destination.

In an embodiment, at least some of the same operations as those of or similar operations to those of operations 601 to 607 of FIG. 6 may be performed by the server 203. At least some of the same operations as those of or similar operations to those of operations 601 to 607 of FIG. 6, which are performed by the server 203, will be described later in detail with reference to FIG. 18.

Figure 7:
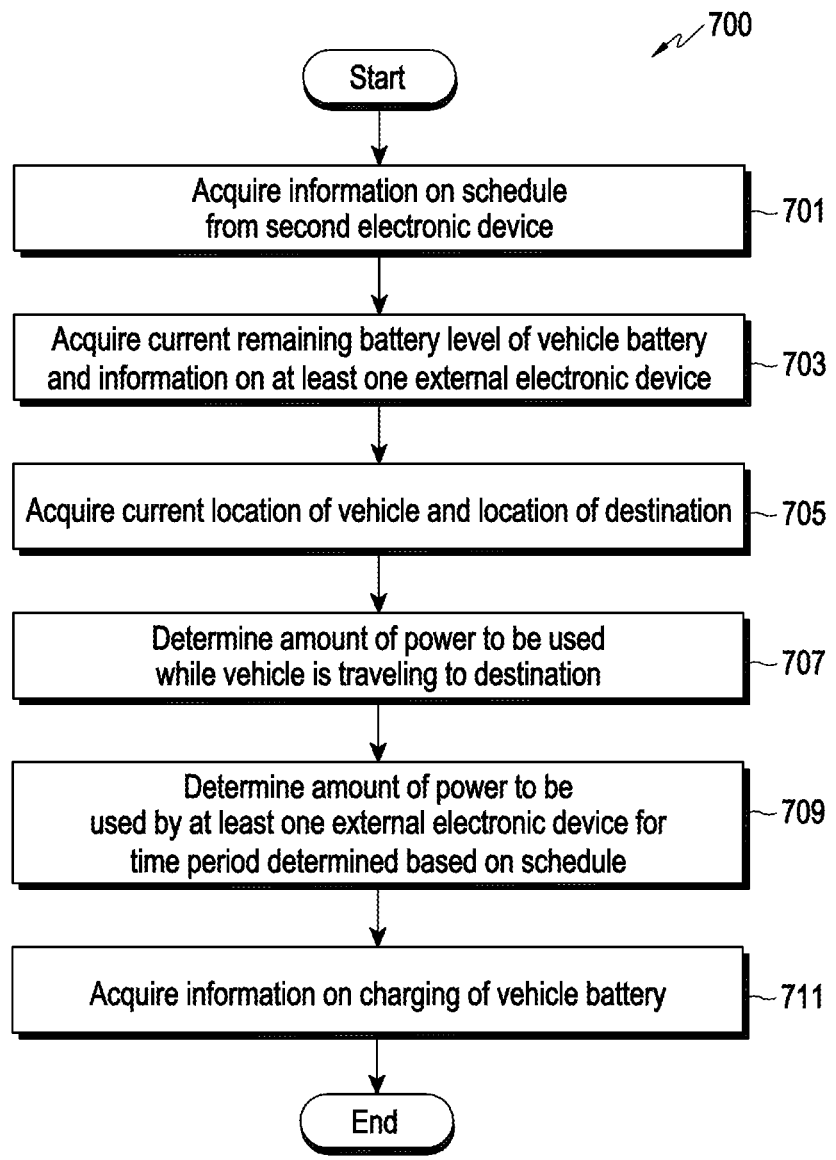
FIG. 7 is a flowchart illustrating a method for providing information related to charging a vehicle battery according to various example embodiments.

FIG. 7 is a flowchart 700 illustrating a method for providing information on charging of a vehicle battery according to various embodiments.

Figure 8:
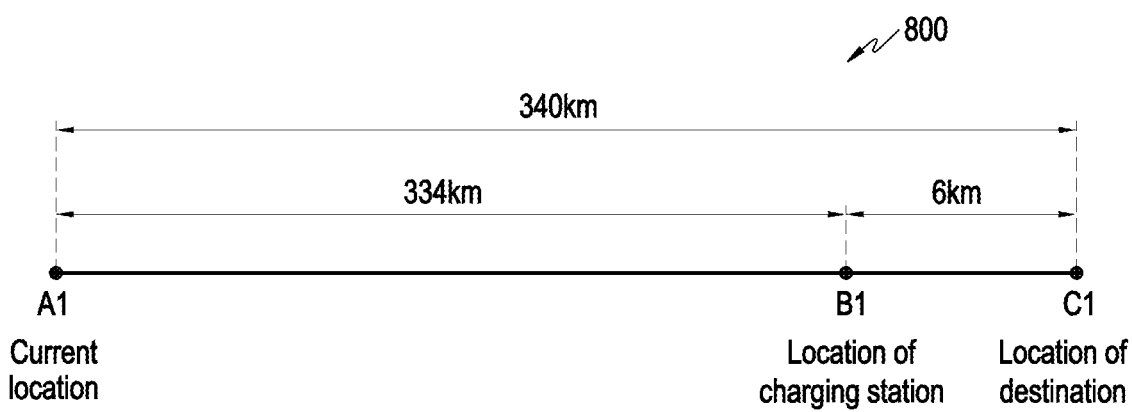
FIG. 8 is an exemplary diagram illustrating a method for providing information related to charging a vehicle battery according to various example embodiments.

FIG. 8 is an exemplary diagram 800 illustrating a method for providing information on charging of a vehicle battery according to various embodiments.

In an embodiment, FIG. 7 and FIG. 8 may be diagrams to describe operations performed by the first electronic device 201 before a vehicle travels from an origin to a destination or while the vehicle is traveling to the destination.

Referring to FIG. 7 and FIG. 8, in operation 701, in an embodiment, the processor 340 may acquire information on a schedule from the second electronic device 202 via the communication module 310.

In an embodiment, information on the schedule (hereinafter, also referred to as "schedule information") may include a place (e.g., a travel destination) (hereinafter, referred to as "schedule place") where a user is to stay for a specific period of time, a date of departure to the schedule place (e.g., a date of departure from the user's house to the travel destination), and a date of departure from the schedule place (e.g., a date of departure from the travel destination to the user's house). For another example, information on the schedule may include a schedule place, a date and time of departure to the schedule place (e.g., 9 AM on Sep. 17, 2021), and a date and time of departure from the schedule place (e.g., 10 AM on Sep. 18, 2021). As another example, information on the schedule may include a schedule place and a schedule period, such as 2 days and 1 night, 3 days and 2 nights, 26 hours, or 52 hours. For another example, information on the schedule may include a name of the schedule (or a subject of the schedule) (e.g., camping), a schedule place, a date (and time) of departing to the schedule place, a date (and time) of departing from the schedule place, and/or a schedule period.

In an embodiment, the processor 340 may determine a time (hereinafter, referred to as a "schedule time") during which a user is to stay in a schedule place, based on information on the schedule. For example, the processor 340 may determine a time to stay in a schedule place, based on a date and time (e.g., 9 AM on Sep. 17, 2021) of departure to the schedule place, a date and time (e.g., 10 AM on Sep. 18, 2021) of departure from the schedule place, and/or a time required for the vehicle to travel to the schedule place.

In an embodiment, the processor 340 may determine a schedule time, based on a history related to a schedule of a user (e.g., a driver of the vehicle and/or a user of the second electronic device 202) and information on the schedule. For example, when information on the schedule includes a schedule period that does not include a specific schedule time, such as 2 days and 1 night, the processor 340 may determine the schedule time to be 26 hours, based on past data related to the schedule of the user (e.g., past data indicating that the user has stayed in a schedule place for an average of about 26 hours, in schedules for which the user has input information on a schedule of 2 days and 1 night by using a schedule application).

In an embodiment, information on the schedule may be acquired based on a user input in the second electronic device 202. For example, the second electronic device 202 may receive, from a user via the schedule application, a name of a schedule (or a subject of the schedule) (e.g., camping), a schedule place, a date (and time) of departing to the schedule place, a date (and time) of departing from the schedule place, and/or a schedule period. The second electronic device 202 may transmit the acquired information on the schedule to the first electronic device 201. However, the disclosure is not limited thereto, and information on the schedule may be input by a user via the input module of the first electronic device 201 and then transferred to the processor 340.

In an embodiment, an operation of determining a schedule time by the processor 340 may be performed in operation 701 and/or operation 709.

In operation 703, in an embodiment, the processor 340 may acquire a current remaining battery level of a battery of the vehicle and information on at least one external electronic device.

At least a part of operation 703 is the same as or similar to at least a part of operation 601 of FIG. 6, so that a detailed description thereof will be omitted.

In operation 705, in an embodiment, the processor 340 may acquire a current location of the vehicle and a location of a destination.

At least a part of operation 705 is the same as or similar to at least a part of operation 603 of FIG. 6, so that a duplicate description will be omitted.

In an embodiment, the processor 340 may acquire the location of the destination, based on information on the schedule. For example, the processor 340 may acquire information on the schedule, which includes the schedule place, from the second electronic device 202 via the memory or the communication module of the first electronic device 201. The processor 340 may determine the location of the schedule place as the location of the destination. In an embodiment, when the location of the schedule place is determined as the location of the destination, the processor 340 may configure a route (e.g., a driving route of the vehicle) from the current location of the vehicle to the location of the destination via a navigation application, based on the current location of the vehicle and the location of the destination.

In operation 707, in an embodiment, the processor 340 may determine the amount of power to be used while the vehicle is traveling to the destination, based on information on the at least one external electronic device, the current location of the vehicle, and the location of the destination.

In an embodiment, the processor 340 may determine (e.g., estimate) power required for the vehicle to travel to the destination, based on the current location of the vehicle and the location of the destination.

In an embodiment, in FIG. 8, when a location B1 of a charging station is located between the current location A1 and the location C1 of the destination on a driving route, a distance (e.g., a shortest distance on the driving route) between the current location A1 and the location C1 of the destination may be 340 (km), a distance between the current location A1 and the location B1 of the charging station may be 334 (km), and a distance between the location B1 of the charging station and the location C1 of the destination may be 6 (km). In an embodiment, in FIG. 8, it may be assumed that an average fuel efficiency of the vehicle (e.g., an average fuel efficiency corresponding to the user) is 6 (km/kWh), and an estimated driving time is 4 (hours).

In an embodiment, the processor 340 may determine the amount of power (e.g., about 56.67 (kWh)) required for the vehicle to travel to the destination, by dividing the distance (e.g., 340 (km)) between the current location A1 and the location C1 of the destination by the average fuel efficiency of the vehicle (e.g., 6 (km/kWh)).

In an embodiment, the processor 340 may determine the amount of power to be used by the at least one external electronic device while the vehicle is traveling to the destination, based on information on the at least one external electronic device and the estimated driving time (e.g., an estimated time it takes to reach the location of the destination from the current location of the vehicle if the vehicle travels on a route that includes the shortest distance).

In an embodiment, the processor 340 may determine the amount of power to be used by each of the at least one external electronic device while the vehicle is traveling to the destination, based on the estimated driving time and information on the at least one external electronic device, as shown in [Table 1] below.

TABLE 1

| Types of external electronic devices | Power consumption | Estimated driving time | Amount of power (=power consumption * estimated driving time) |
| --- | --- | --- | --- |
| Console refrigerator | 60 (W) | 4 (h) | 0.24 (kWh) |
| Console cup holder | 10 (W) | 4 (h) | 0.04 (kWh) |
| Smart monitor | 30 (W) | 4 (h) | 0.12 (kWh) |
| Trunk refrigerator | 300 (W) | 4 (h) | 1.20 (kWh) |

In an embodiment, the processor 340 may determine the amount of power (e.g., 1.60 (kWh)=0.24+0.04+0.12+1.20 (kWh)) to be used by the at least one external electronic device while the vehicle is traveling to the destination, by summing the amount of power to be used by each of the at least one external electronic device while the vehicle is traveling to the destination.

In an embodiment, the processor 340 may determine the amount of power (e.g., about 58.27 (kWh)) to be used while the vehicle is traveling from the current location to the destination, by summing the amount of power (e.g., about 56.67 (kWh)) required for the vehicle to travel to the destination and the amount of power (e.g., 1.60 (kWh)) to be used by the at least one external electronic device while the vehicle is traveling from the current location to the destination.

In operation 709, in an embodiment, the processor 340 may determine the amount of power to be used by the at least one external electronic device for a time (schedule time) determined based on the schedule.

In an embodiment, the processor 340 may determine (e.g., estimate) the amount of power of the at least one external electronic device to be used at the schedule place, based on the schedule time and past use data of the at least one external electronic device. For example, the processor 340 may determine the amount of power to be used by each of the at least one external electronic device at the schedule place for the schedule time period, based on the schedule time (e.g., 26 hours corresponding to 2 days and 1 night) and past use data of each of the at least one external electronic device, as shown in [Table 2] below.

TABLE 2

| Types of external electronic devices | Power consumption | Use time | Amount of power (=power consumption * use time) |
| --- | --- | --- | --- |
| Console refrigerator | 40 (W) | 26 (h) | 1.04 (kWh) |
| Smart monitor | 30 (W) | 5 (h) | 0.15 (kWh) |
| Trunk refrigerator | 300 (W) | 26 (h) | 7.80 (kWh) |
| Trunk oven | 2550 (W) | 4 (h) | 10.20 (kWh) |
| Smart speaker | 30 (W) | 20 (h) | 0.60 (kWh) |
| Dryer | 2000 (W) | 3 (h) | 6.00 (kWh) |

In [Table 2], the use time may be acquired based on the past use data of each of the at least one external electronic device, and may be a time during which the user is expected to use the at least one external electronic device at the schedule place. In [Table 2], the power consumption may be power consumption (or rated power consumption) acquired based on the past use data of each of the at least one external electronic device.

In an embodiment, in comparison of [Table 1] and [Table 2], a type of at least one external electronic device to be used when the vehicle travels may be different from a type of at least one external electronic device to be used at the schedule place.

In an embodiment, the past use data of at least one external electronic device may include a power use pattern of the user with respect to each of the at least one external electronic device. In an embodiment, the power use pattern of the user with respect to each of the at least one external electronic device may include an average use time, an average number of times of use, whether an operation is performed in a low power mode (e.g., a ratio of time, during which an operation is performed in the low power mode, in a total use time during one or more schedule times), and/or an average amount of power use for each of the at least one external electronic device, which have been cumulatively stored in the memory for a designated time (e.g., 1 year) period at one or more places determined by the schedule. In an embodiment, the past use data of each of the at least one external electronic device may be stored in the memory 330 of the first electronic device 201, the memory 430 of the second electronic device 202, the memory 520 of the server 203, and/or a memory of the at least one external electronic device.

In an embodiment, the processor 340 may determine the amount of power (e.g., 25.79 (=1.04+0.15+7.80+10.20+0.60+6.00) (kWh)) to be used by the at least one external electronic device at the schedule place, by summing the amount of power of each of the at least one external electronic device.

In an embodiment, the processor 340 may determine a use time (e.g., the use time in [Table 2]), based on a user input. For example, when the user inputs the number of times (e.g., two times) to use a smart monitor for the schedule time period, the processor 340 may determine 2.5 hours (h) as an average time of using the smart monitor for one time, based on past use data of the smart monitor. The processor 340 may determine the use time of the smart monitor to be 5 hours by multiplying the input number of times (e.g., two times) and the average time (e.g., 2.5 hours) of using for one time. For example, when the user inputs the number of times (e.g., three times) to use a trunk oven for the schedule time period, the processor 340 may determine about 1.33 hours (h) as an average time of using the trunk oven for one time, based on past use data of the trunk oven. The processor 340 may determine the use time of the trunk oven to be about 4 hours by multiplying the input number of times (e.g., three times) and the average time (e.g., 1.33 hours) of using for one time.

In operation 711, in an embodiment, the processor 340 may acquire information on charging of the vehicle battery, based on the current remaining battery level of the battery, the amount of power to be used while traveling from the current location to the destination, and the amount of power to be used by the at least one external electronic device for the schedule time period.

In an embodiment, the processor 340 may provide the acquired information on battery charging of the vehicle.

In an embodiment, the processor 340 may determine a first power amount (e.g., 84.06 (kWh)) obtained by summing the amount of power (e.g., about 58.27 (kWh)) to be used while the vehicle is traveling from the current location to the destination and the amount of power (e.g., 25.79 (kWh)) to be used by the at least one external electronic device for the schedule time period.

In an embodiment, the processor 340 may compare the determined first power amount (e.g., 84.06 (kWh)) with the current remaining battery level (e.g., 60 (kWh)). If the determined first power amount is greater than the current remaining battery level, the processor 340 may display, via the display module 320, information for guiding to charge the vehicle battery before the vehicle arrives at the destination. For example, if the determined first power amount is greater than the current remaining battery level, the processor 340 may display, via the display module 320, information indicating that the vehicle battery needs to be charged before arriving at the destination (or while staying at the schedule place). For another example, if the determined first power amount is greater than the current remaining battery level, information (e.g., the location B1 of the charging station of FIG. 8 and a waiting situation for charging in the charging station) on the charging station for charging the vehicle battery may be acquired, and information (e.g., a route between the current location of the vehicle and the location of the charging station) for guiding the vehicle to travel to the charging station may be displayed via the display module 320, based on the acquired information on the charging station. The aforementioned examples illustrate that information for guiding to charge the vehicle battery is displayed via the display module 320, but the disclosure is not limited thereto. For example, the processor 340 may output, in an audio form via a sound output module (e.g., a speaker), the information for guiding to charge the vehicle battery.

In an embodiment, if the determined first power amount is equal to or less than the current remaining battery level, the processor 340 may repeatedly perform at least some of operations 701 to 711.

In an embodiment, if the determined first power amount is greater than the current remaining battery level, the processor 340 may transmit the guidance information to the first electronic device 201 via the communication module 310 so that the first electronic device 201 outputs the information for guiding to charge the vehicle battery before the vehicle arrives at the destination.

In an embodiment, at least some of the same operations as those of or similar operations to those of operations 703 to 711 of FIG. 7 may be performed by the server 203.

In an embodiment, in FIG. 7, even if the current remaining battery level (e.g., about 60 (kWh)) is greater than or equal to the amount of power (e.g., 58.27 (kWh)) to be used while the vehicle is traveling from the current location to the destination, if the current remaining battery level is less than the first power amount (e.g., 84.06 (kWh))(the amount of power obtained by summing the amount of power to be used while the vehicle is traveling from the current location to the destination and the amount of power to be used by the at least one external electronic device for the schedule time period), discharging of the vehicle battery at a time point unexpected by a user may be minimized or reduced by providing information on charging of the vehicle battery.

Figure 9:
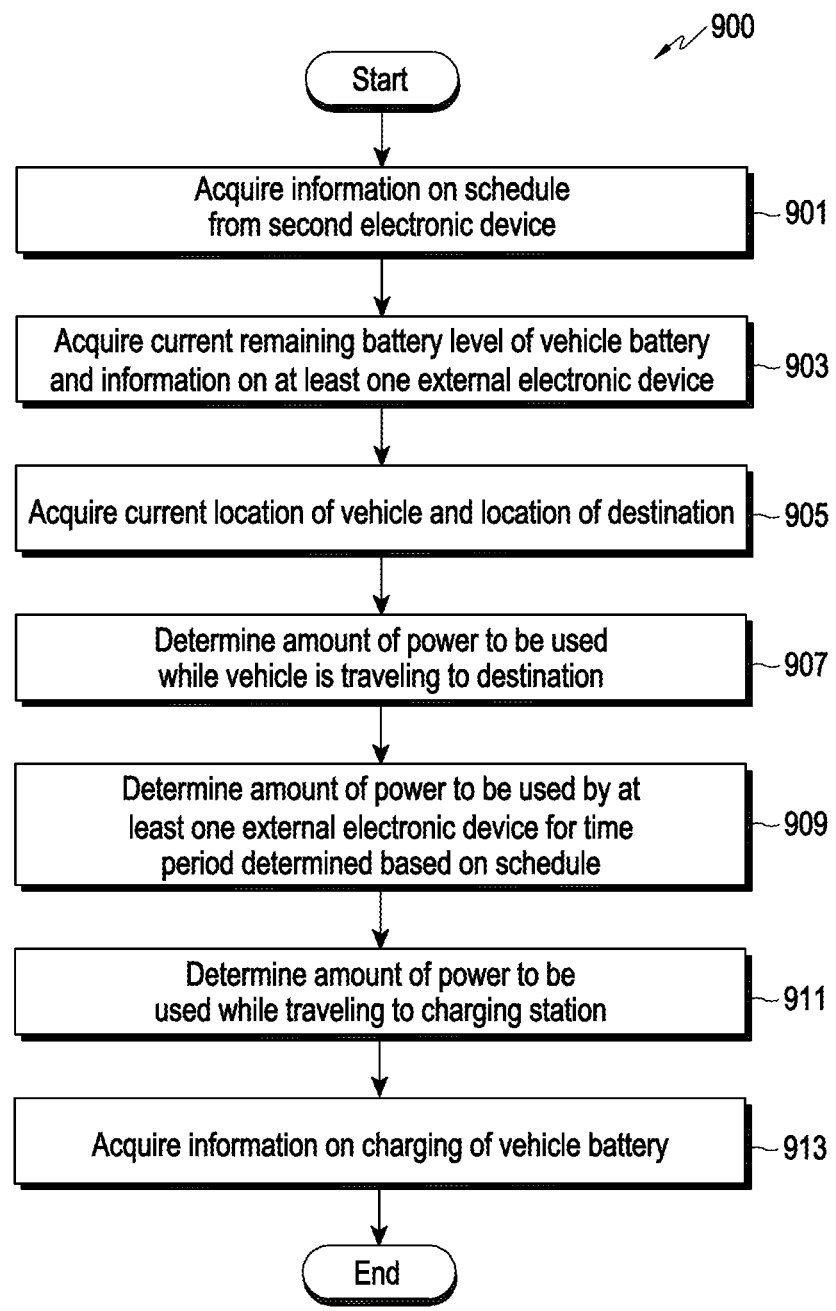
FIG. 9 is a flowchart illustrating a method for providing information related to charging a vehicle battery according to various example embodiments.

FIG. 9 is a flowchart 900 illustrating a method for providing information on charging of a vehicle battery according to various embodiments.

Figure 10:
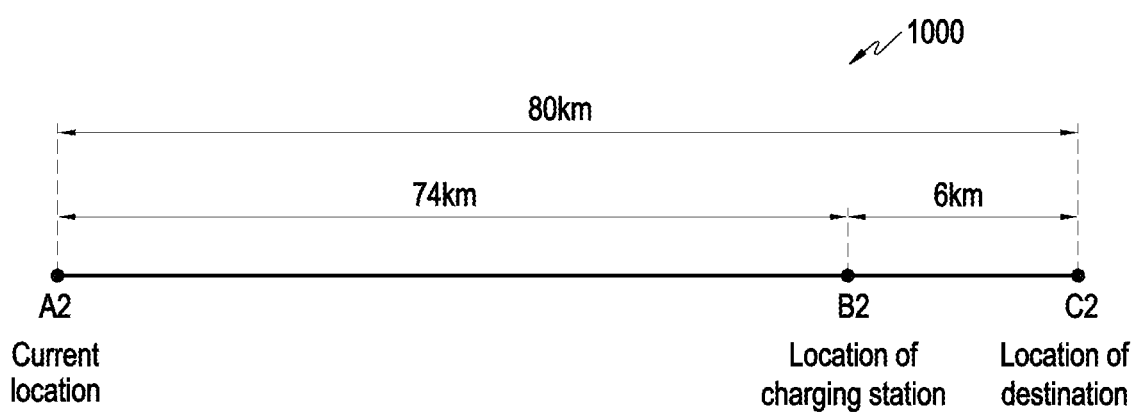
FIG. 10 is an exemplary diagram illustrating a method for providing information related to charging a vehicle battery according to various example embodiments.

FIG. 10 is an exemplary diagram 1000 illustrating a method for providing information on charging of a vehicle battery according to various embodiments.

In an embodiment, FIG. 9 and FIG. 10 may be diagrams to describe operations performed by the first electronic device 201 before a vehicle travels from an origin to a destination or while the vehicle is traveling to the destination.

Referring to FIG. 9 and FIG. 10, in operation 901, in an embodiment, the processor 340 may acquire information on a schedule from the second electronic device 202 via a communication module.

In operation 903, in an embodiment, the processor 340 may acquire a current remaining battery level of a battery of the vehicle and information on at least one external electronic device.

In operation 905, in an embodiment, the processor 340 may acquire a current location of the vehicle and a location of a destination.

Operations 901 to 905 are at least partially the same as or similar to operations 701 to 705 of FIG. 7, respectively, and detailed descriptions thereof will be thus omitted.

In operation 907, in an embodiment, the processor 340 may determine the amount of power to be used while the vehicle is traveling to the destination, based on information on at least one external electronic device, the current location of the vehicle, and the location of the destination.

In an embodiment, the processor 340 may determine (e.g., estimate) power (or the amount of power) required for the vehicle to travel to the destination, based on the current location of the vehicle and the location of the destination.

In an embodiment, in FIG. 10, when a location B2 of a charging station is located between the current location A2 and the location C2 of the destination on a driving route, if a distance (e.g., a shortest distance on the driving route) between the current location A2 and the location C2 of the destination may be 80 (km), a distance between the current location A2 and the location B2 of the charging station may be 6 (km), and a distance between the location B2 of the charging station and the location C2 of the destination may be 6 (km). In an embodiment, in FIG. 10, it may be assumed that an average fuel efficiency of the vehicle (e.g., an average fuel efficiency corresponding to the user) is 6 (km/kWh), and an estimated driving time is 2 (hours). In an embodiment, in FIG. 10, it may be assumed that information on the schedule includes a schedule period that does not include a specific schedule time, such as 3 days and 2 nights, and the schedule time (e.g., a time to stay in a schedule place) determined based on 3 days and 2 nights is 52 hours.

In an embodiment, the processor 340 may determine the amount of power (e.g., about 13.33 (kWh)) required for the vehicle to travel to the destination, by dividing the distance (e.g., 80 (km)) between the current location A2 and the location C2 of the destination by the average fuel efficiency (e.g., 6 (km/kWh)) of the vehicle.

In an embodiment, the processor 340 may determine the amount of power to be used by the at least one external electronic device while the vehicle is traveling to the destination, based on information on the at least one external electronic device and the estimated driving time (e.g., an estimated time it takes to reach the location of the destination from the current location of the vehicle if the vehicle travels on a route that includes the shortest distance).

In an embodiment, the processor 340 may determine the amount of power to be used by each of the at least one external electronic device while the vehicle is traveling to the destination, based on the estimated driving time and information on the at least one external electronic device, as shown in [Table 3] below.

TABLE 3

| Types of external electronic devices | Power consumption | Estimated driving time | Amount of power (=power consumption * estimated driving time) |
| --- | --- | --- | --- |
| Console refrigerator | 60 (W) | 2 (h) | 0.12 (kWh) |
| Console cup holder | 10 (W) | 2 (h) | 0.02 (kWh) |
| Smart monitor | 30 (W) | 2 (h) | 0.06 (kWh) |
| Trunk refrigerator | 300 (W) | 2 (h) | 0.60 (kWh) |

In an embodiment, the processor 340 may determine the amount of power (e.g., 0.80 (kWh)=0.12+0.02+0.06+0.60 (kWh)) to be used by the at least one external electronic device while the vehicle is traveling to the destination, by summing the amount of power to be used by each of the at least one external electronic device while the vehicle is traveling to the destination.

In operation 909, in an embodiment, the processor 340 may determine the amount of power to be used by the at least one external electronic device for a time (schedule time) determined based on the schedule.

In an embodiment, the processor 340 may determine (e.g., estimate) the amount of power of the at least one external electronic device to be used at the schedule place, based on the schedule time and past use data of the at least one external electronic device. For example, the processor 340 may determine the amount of power to be used by each of the at least one external electronic device at the schedule place for the schedule time period, based on the schedule time (e.g., 52 hours corresponding to 3 days and 2 nights) and past use data of each of the at least one external electronic device, as shown in [Table 4] below.

TABLE 4

| Types of external electronic devices | Power consumption | Use time | Amount of power (=power consumption * use time) |
| --- | --- | --- | --- |
| Console refrigerator | 40 (W) | 52 (h) | 2.08 (kWh) |
| Smart monitor | 30 (W) | 10 (h) | 0.30 (kWh) |
| Trunk refrigerator | 300 (W) | 52 (h) | 15.60 (kWh) |
| Trunk oven | 2550 (W) | 8 (h) | 20.40 (kWh) |
| Smart speaker | 30 (W) | 30 (h) | 0.90 (kWh) |
| Dryer | 2000 (W) | 3 (h) | 6.00 (kWh) |

In [Table 4], the use time may be acquired based on the past use data of each of the at least one external electronic device, and may be a time during which the user is expected to use the at least one external electronic device at the schedule place. In [Table 4], the power consumption may be power consumption (or rated power consumption) acquired based on the past use data of each of the at least one external electronic device.

In an embodiment, in comparison of [Table 3] and [Table 4], a type of at least one external electronic device to be used when the vehicle travels may be different from a type of at least one external electronic device to be used at the schedule place.

In an embodiment, the processor 340 may determine the amount of power (e.g., 45.28 (=2.08+0.30+15.60+20.40+0.90+6.00) (kWh)) to be used by the at least one external electronic device at the schedule place, by summing the amount of power of each of the at least one external electronic device.

In an embodiment, the processor 340 may determine a use time (e.g., the use time in [Table 4]), based on a user input. For example, when the user inputs the number of times (e.g., four times) to use a smart monitor for the schedule time period, the processor 340 may determine 2.5 hours (h) as an average time of using the smart monitor for one time, based on past use data of the smart monitor. The processor 340 may determine the use time of the smart monitor to be 10 hours by multiplying the input number of times (e.g., four times) and the average time (e.g., 2.5 hours) of using for one time. For another example, when the user inputs the number of times (e.g., six times) to use a trunk oven for the schedule time period, the processor 340 may determine 1.33 hours (h) as an average time of using the trunk oven for one time, based on past use data of the trunk oven. The processor 340 may determine the use time of the trunk oven to be 8 hours by multiplying the input number of times (e.g., six times) and the average time (e.g., 1.33 hours) of using for one time.

In operation 911, in an embodiment, the processor 340 may determine the amount of power to be used while traveling to the charging station. For example, the processor 340 may determine the amount of power to be used while the vehicle is traveling to the charging station from the destination after arriving at the destination (e.g., the schedule place) and staying in the destination for the schedule time period (e.g., 26 hours corresponding to 2 days and 1 night, which is included in information on the schedule).

In an embodiment, in FIG. 10, the processor 340 may determine the amount of power to be used while traveling from the location C2 of the destination to the location B2 of the charging station. For example, the processor 340 may determine, as the amount of power (e.g., 1.2 (kW)) to be used while traveling from the location C2 of the destination to the location B2 of the charging station, the amount of power obtained by summing the amount of power (e.g., a value (e.g., 1 (kW)) obtained by dividing the distance (e.g., 6 (km)) between the location C2 of the destination and the location B2 of the charging station by the fuel efficiency (e.g., 6 (km/kWh)) of the vehicle required for the vehicle to travel from the location C2 of the destination to the location B2 of the charging station and the amount of power (e.g., a value (e.g., 0.2 (kW)) obtained by multiplying an estimated driving time (e.g., 30 minutes) and power consumption (e.g., 400 (W)) of the at least one external electronic device in [Table 3]) to be used by the at least one external electronic device while the vehicle is traveling from the location C2 of the destination to the location B2 of the charging station.

In operation 913, in an embodiment, the processor 340 may acquire information on charging of the vehicle battery, based on the current remaining battery level of the battery, the amount of power to be used while traveling from the current location to the destination, the amount of power to be used by the at least one external electronic device for the schedule time period, and the amount of power to be used while traveling from the destination (e.g., the schedule place) to the charging station.

In an embodiment, the processor 340 may provide the acquired information on battery charging of the vehicle.

In an embodiment, the processor 340 may determine the amount of power (e.g., about 14.13 (kWh)) to be used while the vehicle is traveling from the current location to the destination, by summing the amount of power (e.g., about 13.33 (kWh)) required for the vehicle to travel to the destination and the amount of power (e.g., 0.80 (kWh)) to be used by the at least one external electronic device while the vehicle is traveling from the current location to the destination.

In an embodiment, the processor 340 may determine a second power amount (e.g., 60.61 (kWh)) obtained by summing the amount of power (e.g., about 14.13 (kWh)) to be used while the vehicle is traveling from the current location to the destination, the amount of power (e.g., 45.28 (kWh)) to be used by the at least one external electronic device for the schedule time period, and the amount of power (e.g., 1.2 (kW)) to be used while traveling from the destination (e.g., the schedule place) to the charging station.

In an embodiment, the processor 340 may compare the determined second power amount (e.g., 60.61 (kWh)) with the current remaining battery level (e.g., 60 (kWh)). If the determined second power amount is greater than the current remaining battery level, the processor 340 may display, via the display module 320, information for guiding to charge the vehicle battery before the vehicle arrives at the destination or while the vehicle is staying at the destination (e.g., the schedule place). For example, if the determined second power amount is greater than the current remaining battery level, the processor 340 may display, via the display module 320, information indicating that the vehicle battery needs to be charged before arriving at the destination (or while staying at the schedule place). For another example, if the determined second power amount is greater than the current remaining battery level, information (e.g., the location of the charging station and a waiting situation for charging in the charging station) on the charging station for charging the vehicle battery may be acquired, and information (e.g., the route between the current location of the vehicle and the location of the charging station) for guiding the vehicle to travel to the charging station may be displayed via the display module 320, based on the acquired information on the charging station. The aforementioned examples illustrate that information for guiding to charge the vehicle battery is displayed via the display module 320, but the disclosure is not limited thereto. For example, the processor 340 may output, in an audio form via a sound output module (e.g., a speaker), the information for guiding to charge the vehicle battery.

In an embodiment, if the determined second power amount is greater than the current remaining battery level, the processor 340 may provide information on a time point at which the vehicle battery needs to be charged while staying in the schedule place and/or a time point at which the vehicle is to depart to the charging station from the schedule place in order to charge the vehicle battery. For example, if the determined second power amount is greater than the current remaining battery level, the processor 340 may determine (e.g., estimate) a time point at which the vehicle battery needs to be charged while staying in the schedule place and/or a time point at which the vehicle is to depart to the charging station from the schedule place in order to charge the vehicle battery. The processor 340 may display the determined time point via the display module 320.

In an embodiment, when the determined second power amount is equal to or less than the current remaining battery level, the processor 340 may repeatedly perform at least some of operations 901 to 911.

In an embodiment, if the determined second power amount is greater than the current remaining battery level, the processor 340 may transmit the guidance information to the first electronic device 201 via the communication module 310 so that the first electronic device 201 outputs the information for guiding to charge the vehicle battery before the vehicle arrives at the destination.

In an embodiment, at least some of the same operations as those of or similar operations to those of operations 903 to 913 of FIG. 9 may be performed by the server 203.

In an embodiment, in FIG. 9, even if the current remaining battery level (e.g., about 60 (kWh)) is greater than or equal to a power amount obtained by summing the amount of power (e.g., 14.13 (kWh)) to be used while the vehicle is traveling from the current location to the destination and the amount of power (e.g., 45.28 (kWh)) to be used by the at least one external electronic device for the schedule time period, if the current remaining battery level is less than the second power amount (e.g., 60.61 (kWh))(a power amount obtained by summing the amount of power to be used while the vehicle is traveling from the current location to the destination, the amount of power to be used by the at least one external electronic device for the schedule time period, and the amount of power to be used while traveling from the destination (e.g., the schedule place) to the charging station), discharging of the vehicle battery at a time point unexpected by the user may be minimized or reduced by providing information on charging of the vehicle battery.

Figure 11:
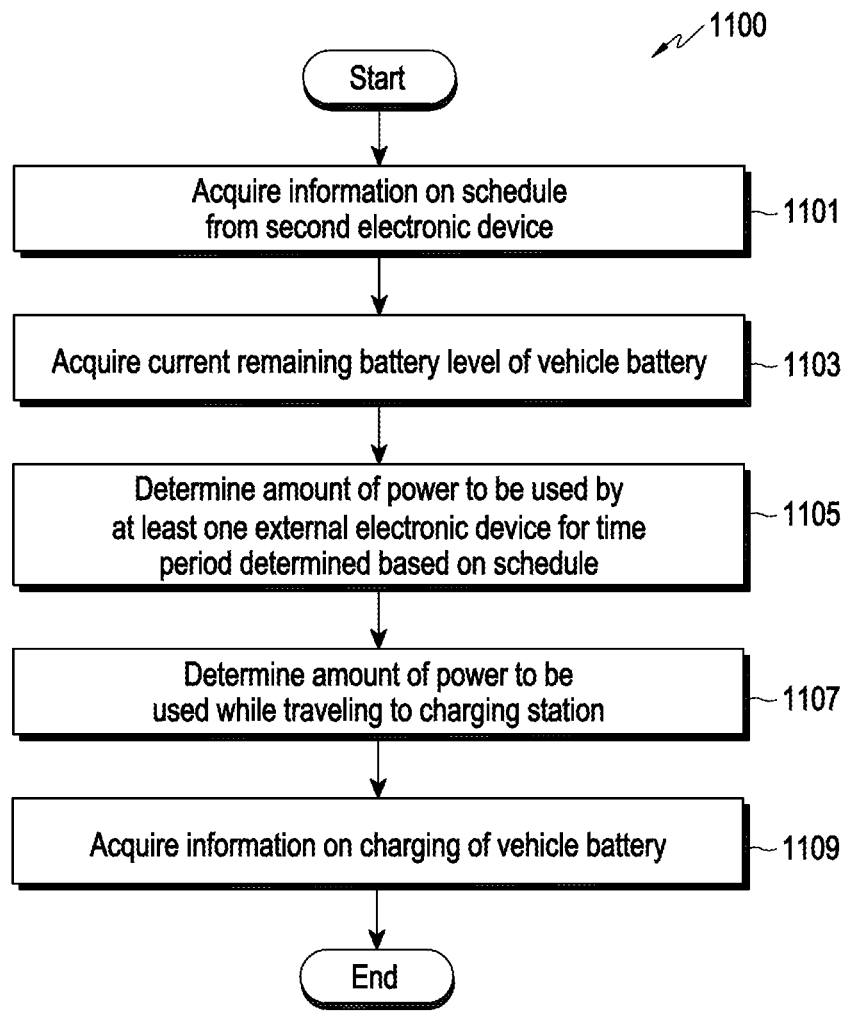
FIG. 11 is a flowchart illustrating a method for providing information related to charging a vehicle battery according to various example embodiments.

FIG. 11 is a flowchart 1100 illustrating a method for providing information on charging of a vehicle battery according to various embodiments.

Figure 12:
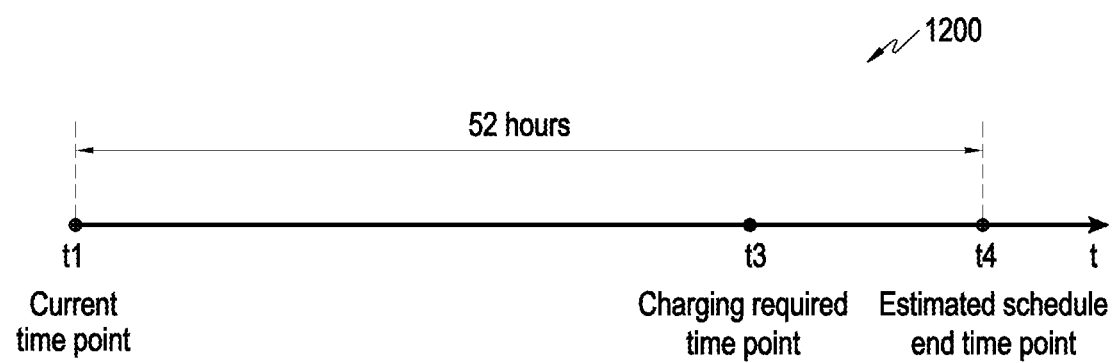
FIG. 12 is an exemplary diagram illustrating a method for providing information related to charging a vehicle battery according to various example embodiments.

FIG. 12 is an exemplary diagram 1200 illustrating a method for providing information on charging of a vehicle battery according to various embodiments.

In an embodiment, FIG. 11 and FIG. 12 may be diagrams to describe operations performed by the first electronic device 201 while a user is staying in a schedule place.

In operation 1101, in an embodiment, the processor 340 (comprising processing circuitry) may acquire information on a schedule from the second electronic device 202 via the communication module 310.

Operation 1101 is at least partially the same as or similar to operation 701 or operation 901, and detailed descriptions thereof will be thus omitted.

In operation 1103, in an embodiment, the processor 340 may acquire a current remaining battery level of a battery of a vehicle.

Operation 1103 is at least partially the same as or similar to the operations of acquiring the current remaining battery level of the vehicle battery in operation 703 or operation 903, and detailed descriptions thereof will be thus omitted.

In operation 1105, in an embodiment, the processor 340 may determine the amount of power to be used by at least one external electronic device for a time (schedule time) determined based on the schedule.

In an embodiment, the processor 340 may determine (e.g., estimate) the amount of power of the at least one external electronic device to be used at the schedule place, based on the schedule time and past use data of the at least one external electronic device.

In an embodiment, the processor 340 may determine (e.g., estimate) the amount of power of the at least one external electronic device to be used at the schedule place, based on a schedule time, a current time point, and past use data of the at least one external electronic device. For example, the processor 340 may acquire (e.g., calculate) a time from the current time point to a time point (e.g., a time to depart to the user's house from the schedule place) when the schedule is completed, while the user is staying in the schedule place. The processor 340 may acquire (e.g., calculate) the amount of power to be used by the at least one external electronic device during a time from the current time point to the point in time (hereinafter, referred to as an "estimate schedule end time") when the schedule is completed, based on past use data of the at least one external electronic device.

In an embodiment, the processor 340 may determine (e.g., estimate) the amount of power of the at least one external electronic device to be used at the schedule place, based on the schedule time, the current time point, the past use data of the at least one external electronic device, and the currently used power of the at least one external electronic device. For example, the power of the at least one external electronic device that the user uses while staying in the schedule place may be different from the past use data of the at least one external electronic device. The processor 340 may determine (e.g., estimate) the amount of power of the at least one external electronic device to be used at the schedule place in real time (or periodically), in consideration of the currently used power of the at least one external electronic device in addition to the schedule time, the current time point, and the past use data of the at least one external electronic device.

In operation 1107, in an embodiment, the processor 340 may determine the amount of power to be used while traveling from the schedule place to the charging station. For example, the processor 340 may determine, as the amount of power to be used while traveling from the schedule place to the location of the charging station, a power amount obtained by summing the amount of power required for the vehicle to travel from the location of the schedule place to the location of the charging station and the amount of power to be used by the at least one external electronic device that is to be used while the vehicle is traveling from the location of the schedule place to the location of the charging station.

In operation 1109, in an embodiment, the processor 340 may acquire information on charging of the vehicle battery, based on the current remaining battery level of the battery, the amount of power to be used by the at least one external electronic device for the schedule time period, and the amount of power to be used while traveling from the schedule place to the charging station.

In an embodiment, the processor 340 may provide the acquired information on battery charging of the vehicle.

In an embodiment, if a third power amount, which is obtained by summing the amount of power to be used by the at least one external electronic device for the schedule time period (e.g., a time from the current time point to a schedule completion time point) and the amount of power to be used while traveling from the schedule place to the charging station, is greater than the current remaining battery level, the processor 340 may display, via the display module 320, information (e.g., information indicating that the vehicle battery needs to be charged and information on the charging station) for guiding to charge the vehicle battery.

In an embodiment, if the determined third power amount is greater than the current remaining battery level, the processor 340 may provide information on a time point at which the vehicle battery needs to be charged while staying in the schedule place and/or a time point at which the vehicle is to depart to the charging station from the schedule place in order to charge the vehicle battery. For example, in FIG. 12, during a time (e.g., about 52 hours) from a current time point t1 to an estimated schedule end time t4, if the determined third power amount is identified to be greater than the current remaining battery level, the processor 340 may determine (e.g., estimate) a time point (e.g., a charging required time point t3) at which the vehicle battery needs to be charged and/or a time point to depart to the charging station from the schedule place in order to charge the vehicle battery.

In an embodiment, the processor 340 may determine (e.g., estimate) a time point at which the remaining battery level of the vehicle battery becomes equal to the amount of power to be used while traveling from the schedule place to the charging station, based on the current remaining battery level of the battery, past use data of the at least one external electronic device, and/or currently used power of the at least one external electronic device. The processor 340 may determine the determined time point as a time point to depart from the schedule place to the charging station in order to charge the vehicle battery.

In an embodiment, the processor 340 may determine (e.g., estimate) a time point at which the remaining battery level of the vehicle battery becomes a designated value (e.g., a lowest battery level configured during configuration related to the vehicle voltage), based on the current remaining battery level of the battery, past use data of the at least one external electronic device, and/or currently used power of the at least one external electronic device. The processor 340 may determine the determined time point as a time point at which the vehicle battery needs to be charged.

In an embodiment, when the time point at which the vehicle battery needs to be charged and/or the time point to depart from the schedule place to the charging station in order to charge the vehicle battery are determined, the processor 340 may display information indicating the determined time points via the display module 320.

In the aforementioned examples, it is illustrated that information for guiding to charge the vehicle battery, which includes the time point at which the vehicle battery needs to be charged and/or the time point to depart from the schedule place to the charging station in order to charge the vehicle battery, is displayed via the display module 320, but the disclosure is not limited thereto. For example, the processor 340 may output, in an audio form via a sound output module (e.g., a speaker), the information for guiding to charge the vehicle battery.

In an embodiment, if the determined third power amount is equal to or less than the current remaining battery level, the processor 340 may repeatedly perform at least some of operations 1101 to 1109.

In an embodiment, if the determined third power amount is greater than the current remaining battery level, the processor 340 may transmit the guidance information to the first electronic device 201 via the communication module 310 so that the first electronic device 201 outputs the information for guiding to charge the vehicle battery before the vehicle arrives at the destination.

In an embodiment, at least some of the same operations as those of or similar operations to those of operations 1103 to 1109 of FIG. 11 may be performed by the server 203.

Figure 13:
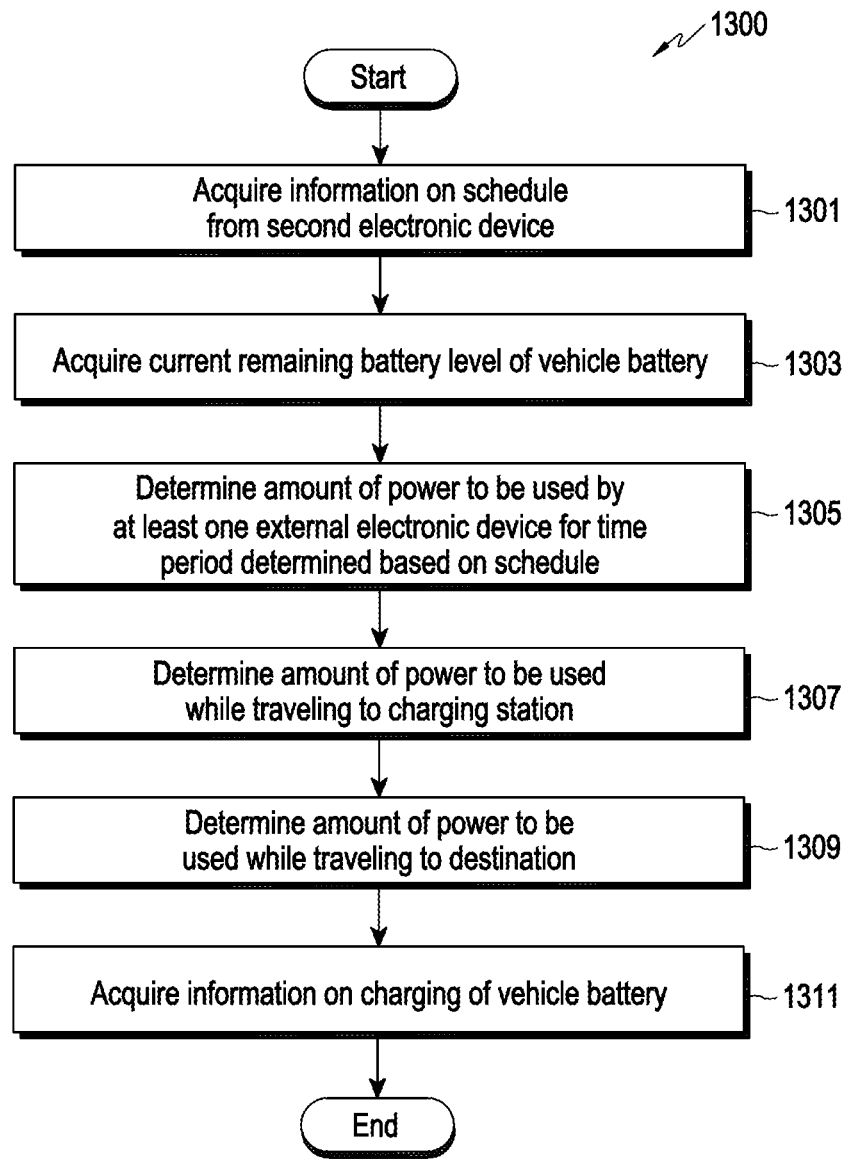
FIG. 13 is a flowchart illustrating a method for providing information related to charging a vehicle battery according to various example embodiments.

FIG. 13 is a flowchart 1300 illustrating a method for providing information on charging of a vehicle battery according to various embodiments.

Figure 14:
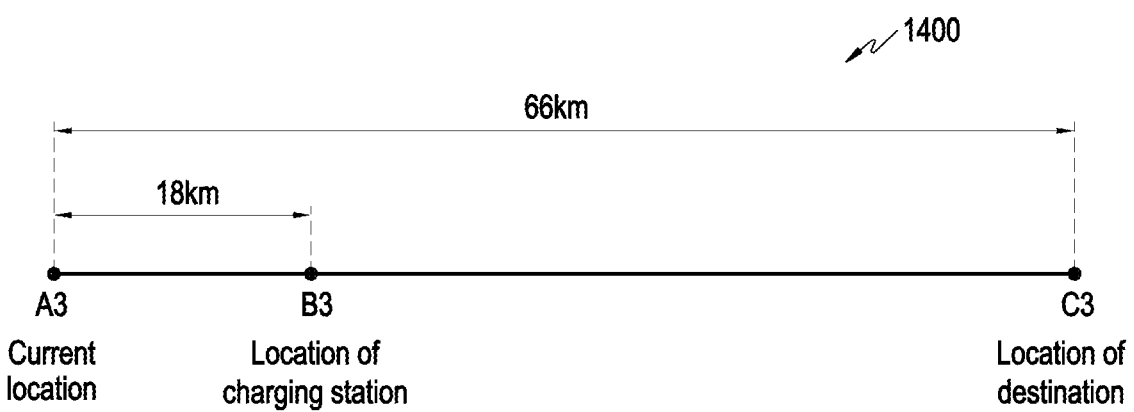
FIG. 14 is an exemplary diagram illustrating a method for providing information related to charging a vehicle battery according to various example embodiments.

FIG. 14 is an exemplary diagram 1400 illustrating a method for providing information on charging of a vehicle battery according to various embodiments.

In an embodiment, FIG. 13 and FIG. 14 may be diagrams to describe operations performed by the first electronic device 201 while a user is staying in a schedule place.

In operation 1301, in an embodiment, the processor 340 may acquire information on a schedule from the second electronic device 202 via the communication module 310.

Operation 1301 is at least partially the same as or similar to operation 1101, and detailed descriptions thereof will be thus omitted.

In operation 1303, in an embodiment, the processor 340 may acquire a current remaining battery level of a battery of a vehicle.

Operation 1303 is at least partially the same as or similar to operation 1103, and detailed descriptions thereof will be thus omitted.

In operation 1305, in an embodiment, the processor 340 may determine the amount of power to be used by the at least one external electronic device for a time (schedule time) determined based on the schedule.

Operation 1305 is at least partially the same as or similar to operation 1105, and detailed descriptions thereof will be thus omitted.

In operation 1307, in an embodiment, the processor 340 may determine the amount of power to be used while traveling from a schedule place to a charging station.

Operation 1307 is at least partially the same as or similar to operation 1107, and detailed descriptions thereof will be thus omitted.

In operation 1309, in an embodiment, the processor 340 may determine the amount of power to be used while traveling from the schedule place to a destination (e.g., a user's house).

In an embodiment, the processor 340 may acquire a current location of the vehicle (e.g., a location of the schedule place) and a location of the destination (e.g., the user's house). In an embodiment, the processor 340 may determine (e.g., estimate) the amount of power required for the vehicle to travel to the destination, based on the current location of the vehicle and the location of the destination.

In an embodiment, in FIG. 14, when a location B3 of the charging station is located between the current location A3 and the location C3 of the destination on a driving route, a distance (e.g., a shortest distance on the driving route) between the current location A3 and the location C3 of the destination may be 66 (km), and a distance between the current location A3 and the location B3 of the charging station may be 18 (km). In an embodiment, in FIG. 14, it may be assumed that an average fuel efficiency of the vehicle (e.g., an average fuel efficiency corresponding to the user) is 6 (km/kWh), and an estimated driving time is 1.5 (hours).

In an embodiment, the processor 340 may determine the amount of power (e.g., 11 (kWh)) required for the vehicle to travel to the destination, by dividing the distance (e.g., 66 (km)) between the current location A3 and the location C3 of the destination by the average fuel efficiency (e.g., 6 (km/kWh)) of the vehicle.

In an embodiment, the processor 340 may determine the amount of power to be used by the at least one external electronic device while the vehicle is traveling to the destination, based on information on the at least one external electronic device and the estimated driving time (e.g., an estimated time it takes to reach the location of the destination from the current location of the vehicle if the vehicle travels on a route that includes the shortest distance).

In an embodiment, the processor 340 may determine the amount of power to be used by each of the at least one external electronic device(s) while the vehicle is traveling to the destination, based on the estimated driving time and information on the at least one external electronic device, as shown in [Table 5] below.

TABLE 5

| Types of external electronic devices | Power consumption | Estimated driving time | Amount of power (=power consumption * estimated driving time) |
|---|---|---|---|
| Console refrigerator | 60 (W) | 1.5 (h) | 0.090 (kWh) |
| Console cup holder | 10 (W) | 1.5 (h) | 0.015 (kWh) |
| Smart monitor | 30 (W) | 1.5 (h) | 0.045 (kWh) |
| Trunk refrigerator | 300 (W) | 1.5 (h) | 0.450 (kWh) |

In an embodiment, the processor 340 may determine the amount of power (e.g., 0.6 (kWh)=0.090+0.015+0.045+0.450 (kWh)) to be used by the at least one external electronic device while the vehicle is traveling to the destination, by summing the amount of power to be used by each of the at least one external electronic device while the vehicle is traveling to the destination.

In an embodiment, the processor 340 may determine the amount of power (e.g., about 11.6 (kWh)) to be used while the vehicle is traveling from the current location to the destination, by summing the amount of power (e.g., 11 (kWh)) required for the vehicle to travel to the destination and the amount of power (e.g., 0.60 (kWh)) to be used by the at least one external electronic device while the vehicle is traveling from the current location to the destination.

In operation 1311, in an embodiment, the processor 340 may acquire information on charging of the vehicle battery, based on the current remaining battery level of the battery, the amount of power to be used by the at least one external electronic device for the schedule time period, the amount of power to be used while traveling from the schedule place to the charging station, and the amount of power to be used while traveling from the schedule place to the destination.

In an embodiment, the processor 340 may provide the acquired information on battery charging of the vehicle.

In an embodiment, the processor 340 may acquire (e.g., calculate) the amount of power to be used while traveling from the schedule place to the charging station. For example, in FIG. 14, the processor 340 may determine, as the amount of power to be used while traveling from the schedule place to the location of the charging station, a power amount obtained by summing the amount of power required for the vehicle to travel from the location (e.g., the current location A3) of the schedule place to the location B3 of the charging station and the amount of power to be used by the at least one external electronic device that is to be used while the vehicle is traveling from the location of the schedule place to the location of the charging station.

In an embodiment, if a fourth power amount, which is obtained by summing the amount of power to be used by the at least one external electronic device for the schedule time period (e.g., a time from the current time point to a schedule completion time point) and the amount of power to be used while traveling from the schedule place to the destination, is greater than the current remaining battery level, the processor 340 may display, via the display module 320, information (e.g., information indicating that the vehicle battery needs to be charged and information on the charging station) for guiding to charge the vehicle battery.

In an embodiment, if the current remaining battery level is equal to or less than the fourth power amount obtained by summing the amount of power to be used by the at least one external electronic device for the schedule time period (e.g., the time from the current time point to the schedule completion time point) and the amount of power to be used while traveling from the schedule place to the destination, and if the current remaining battery level is greater than a fifth power amount obtained by summing the amount of power to be used by the at least one external electronic device for the schedule time period and the amount of power to be used while traveling from the schedule place to the charging station, the processor 340 may display, via the display module 320, the guidance information enabling the vehicle to travel to the charging station, after the schedule time expires.

In an embodiment, if the current remaining battery level is less than the fifth power amount obtained by summing the amount of power to be used by the at least one external electronic device for the schedule time period (e.g., the time from the current time point to the schedule completion time point) and the amount of power to be used while traveling from the schedule place to the charging station, the processor 340 may display, via the display module 320, the guidance information enabling the vehicle to travel to the charging station, before the schedule time expires (e.g., while staying in the schedule place).

In an embodiment, the processor 340 may determine a time point at which the vehicle battery needs to be charged and/or a time point to depart from the schedule place to the charging station in order to charge the vehicle battery, and may display, via the display module 320, information indicating the determined time points.

In an embodiment, if the determined fifth power amount is equal to or less than the current remaining battery level, the processor 340 may repeatedly perform at least some of operations 1301 to 1311.

In an embodiment, if the determined fifth power amount or the determined fourth power amount is greater than the current remaining battery level, the processor 340 may transmit the guidance information to the first electronic device 201 via the communication module 310 so that the first electronic device 201 outputs the information for guiding to charge the vehicle battery before the vehicle arrives at the destination.

In an embodiment, at least some of the same operations as those of or similar operations to those of operations 1303 to 1311 of FIG. 13 may be performed by the server 203.

Figure 15A:
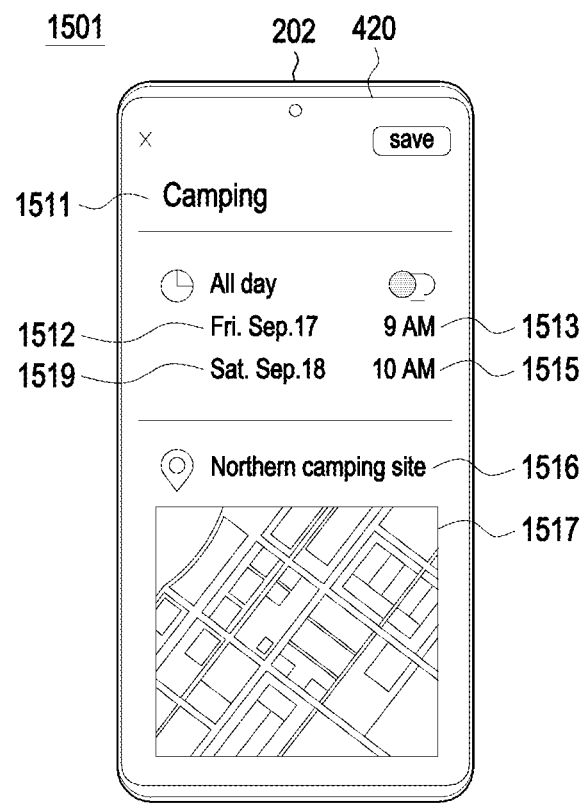
FIG. 15A is exemplary diagram illustrating information provided by the first electronic device or the second electronic device according to various example embodiments.
Figure 15A:
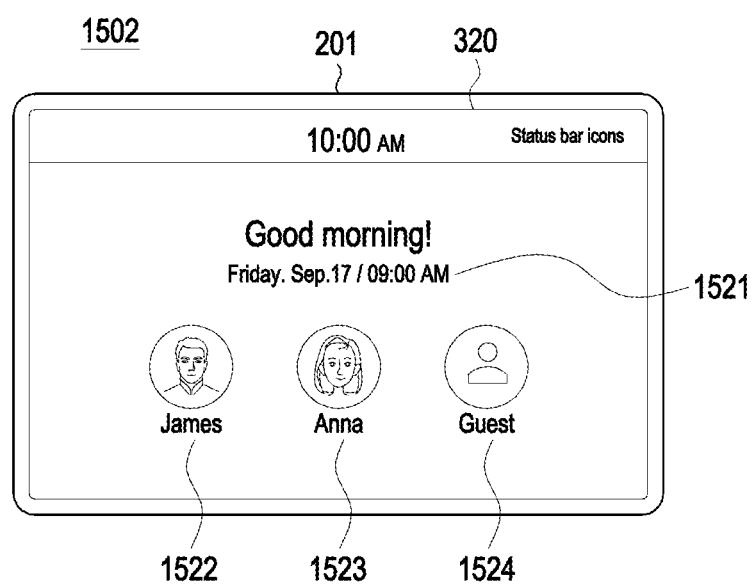
Figure 15B:
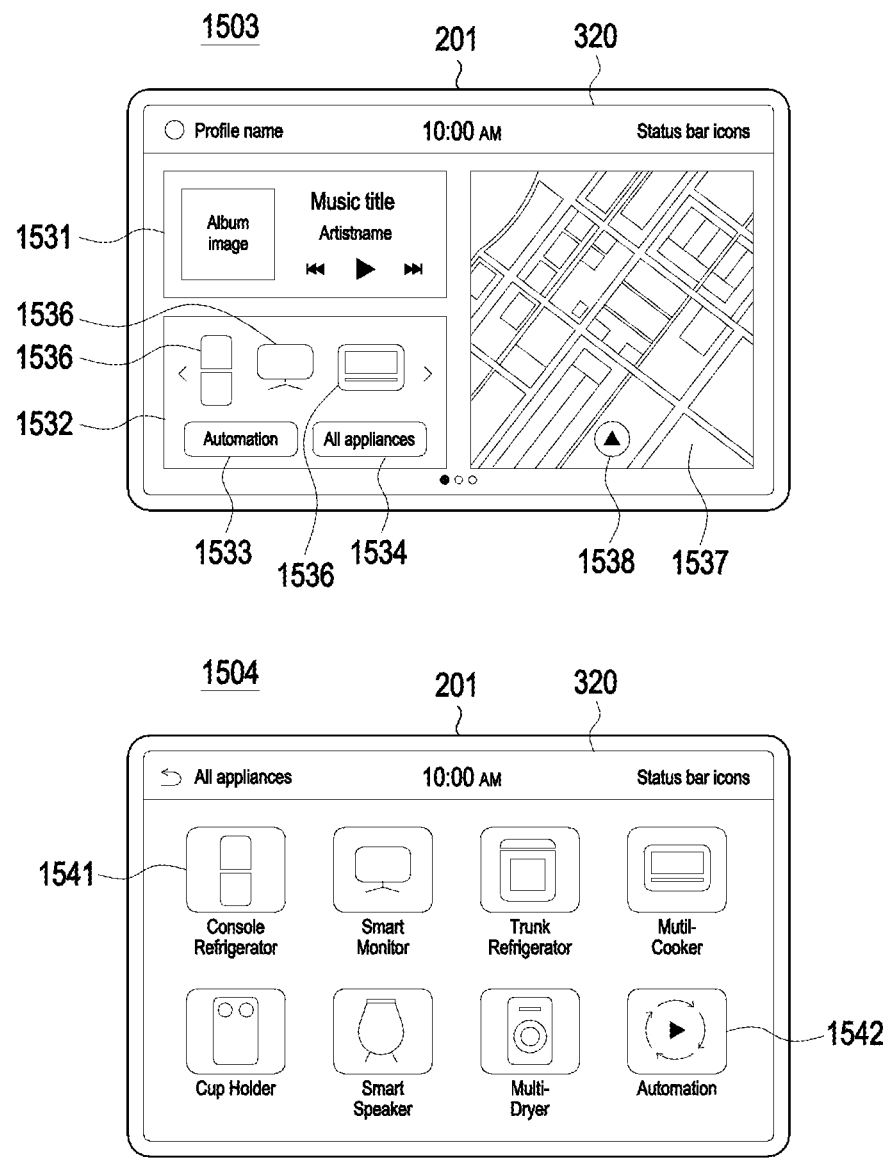
FIG. 15B is exemplary diagram illustrating information provided by the first electronic device or the second electronic device according to various example embodiments.
Figure 15C:
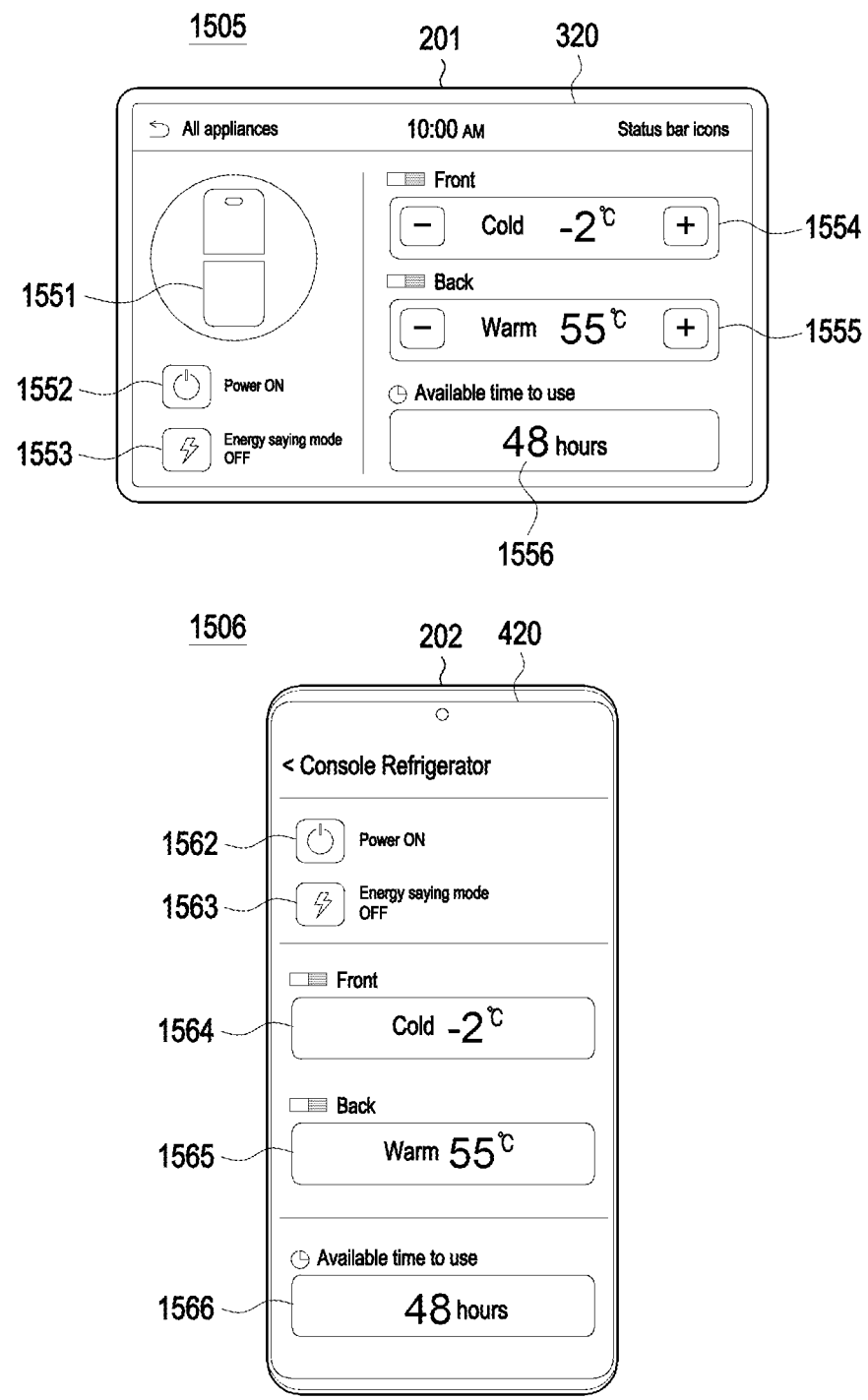
FIG. 15C is exemplary diagram illustrating information provided by the first electronic device or the second electronic device according to various example embodiments.

FIG. 15A to FIG. 15C are exemplary diagrams illustrating information provided by the first electronic device 201 or the second electronic device 202, according to various embodiments.

Referring to FIG. 15A to FIG. 15C, in an embodiment, in reference numeral 1501, the second electronic device 202 may receive information on a schedule, based on a user input. For example, based on the user input, the second electronic device 202 may register information on the schedule in a server that manages a schedule application.

In an embodiment, as illustrated in reference numeral 1501, in an embodiment, the processor 440 of the second electronic device 202 may display information on the schedule via the display module 420. For example, the processor 440 may display information on the schedule, which includes a name of the schedule (or a subject of the schedule) 1511, a date 1512 and time 1513 of departure to a schedule place, a date 1519 (e.g., a date of departure from a travel destination to a user's house) and time 1515 of departure from the schedule place, a schedule place 1516, and/or a map 1517 including a location of the schedule place. In an embodiment, as described above, information on the schedule may be used to determine (e.g., estimate) the amount of power to be used by at least one external electronic device at the schedule place for at least a part of a schedule period.

In an embodiment, in reference numeral 1502, the processor 340 may display, via the display module 320, a screen including information 1522, 1523, and 1524 (e.g., images and/or names of multiple users) corresponding to each of multiple users at a point in time when a vehicle is started or when the user gets on the vehicle and/or date(s)/time(s) 1521. The processor 340 may select a user from among the multiple users, based on a user input.

In an embodiment, in reference numeral 1503, the processor 340 may display, via the display module 320, a screen including information for controlling of at least one external electronic device. For example, the processor 340 may identify a configuration of at least one external electronic device, which corresponds to the user selected in reference numeral 1502. The processor 340 may display, via the display module 320, a screen including information for controlling of the identified at least one external electronic device. In an embodiment, as illustrated in reference numeral 1503, the processor 340 may display, via the display module 320 and a first area 1531, information for controlling of an application executed by the first electronic device 201. The processor 340 may display, via the display module 320 and a second area 1532, at least one object 1536 indicating the at least one external electronic device, an object 1533 for configuration of an automation function, and an object 1534 for controlling of the at least one external electronic device. The processor 340 may display navigation information (e.g., a map including an object 1538 indicating a current location of the vehicle and a route via which the vehicle travels from the current location of the vehicle to a location of a destination) via the display module 320 and a third area 1537.

In an embodiment, in reference numeral 1504, when a user input for the object 1534 for controlling of the at least one external electronic device is received, the processor 340 may display, via the display module 320, a screen including an object (e.g., an object 1541) indicating the at least one external electronic device and an object 1542 for configuration of the automation function.

In an embodiment, in reference numeral 1505, when a user input for an object (e.g., the object 1541) indicating the at least one external electronic device is received, the processor 340 may display, via the display module 320, information indicating a state of the at least one external electronic device and/or information for controlling of the at least one external electronic device. For example, as illustrated in reference numeral 1505, the processor 340 may display, via the display module 320, an object 1551 indicating a console refrigerator, an object 1552 for controlling of a power on/off and a power on/off state of the console refrigerator, an object 1553 for controlling of a low-power mode on/off and a low-power mode on/off state of the console refrigerator, areas 1554 and 1555 for controlling of temperature of the console refrigerator, and/or an available time 1556 (e.g., 48 hours) to use the console refrigerator.

In an embodiment, the processor 340 may acquire (e.g., calculate) the amount of power consumption (e.g., the amount of power being used in real time) by the at least one external electronic device and/or the amount of power required to complete an operation currently being performed by the at least one external electronic device. The processor 340 may acquire (e.g., calculate) a time during which each of the at least one external electronic device is available, based on the acquired power amount and information on a current remaining battery level of the vehicle battery. The processor 340 may display the acquired available time for each of the at least one external electronic device, via the display module 320 or the at least one external electronic device.

In an embodiment, the processor 340 may transmit, to the second electronic device 202 via the communication module 310, information indicating a state of the at least one external electronic device and/or information for controlling of the at least one external electronic device. In an embodiment, the second electronic device 202 may display, via the display module 420, information indicating a state of the at least one external electronic device and/or information for controlling of the at least one external electronic device. For example, as illustrated in reference numeral 1506, the second electronic device 202 may display, via the display module 420, an object 1562 for controlling of the power on/off and the power on/off state of the console refrigerator, an object 1563 for controlling of the low-power mode on/off and the low-power mode on/off state of the console refrigerator, areas 1564 and 1565 for controlling of temperature of the console refrigerator, and/or an available time 1566 (e.g., 48 hours) to use the console refrigerator.

Although not illustrated in FIG. 15A to FIG. 15C, in an embodiment, in reference numeral 1503 or reference numeral 1504, when a user input is received in the object 1533 or object 1542 for configuration of the automation function, the processor 340 may configure various modes related to the at least one external electronic device. For example, when a user input is received in the object 1533 or object 1542 for configuration of the automation function, the processor 340 may display, via the display module 320, a first mode (e.g., a configuration of at least one external electronic device that the user is to use while commuting to work) for the at least one external electronic device and/or a second mode (e.g., a configuration of at least one external electronic device that the user is to use while traveling) for the at least one external electronic device.

Figure 16A:
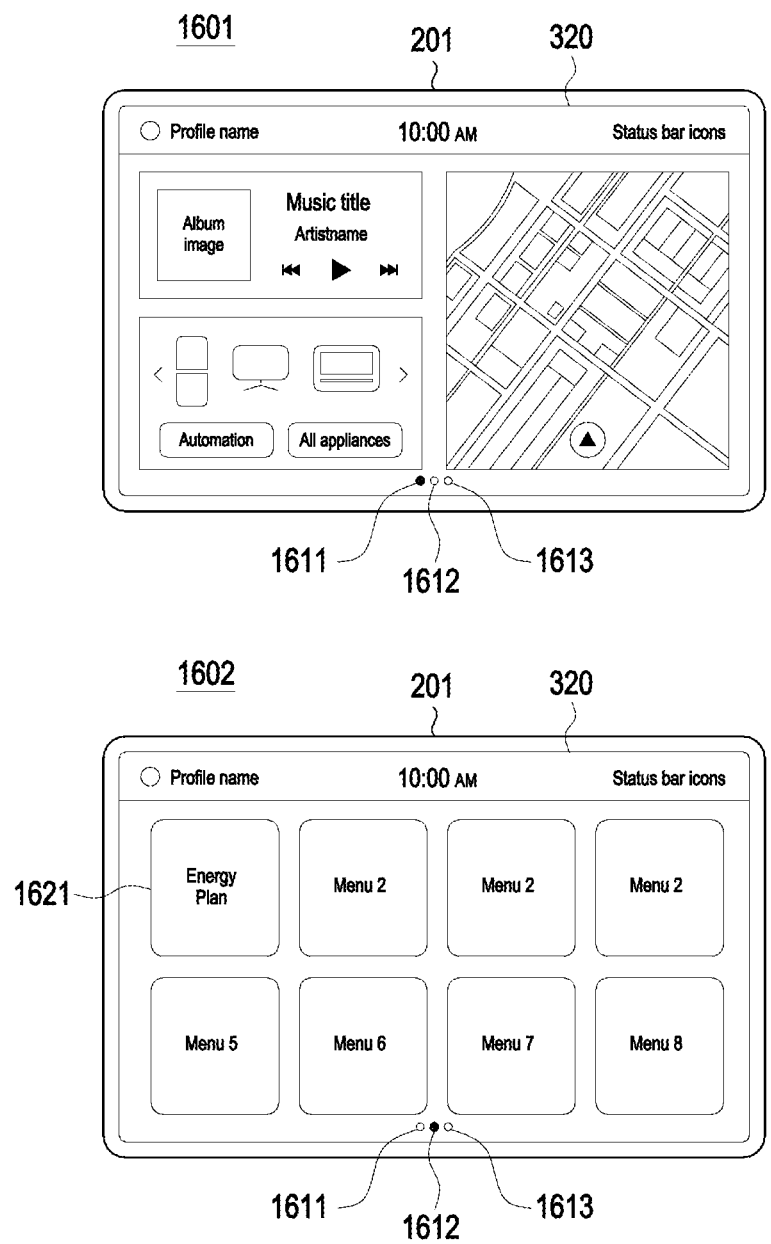
FIG. 16A is exemplary diagram for describing a method for providing information related to charging a vehicle battery by the first electronic device or the second electronic device according to various example embodiments.
Figure 16B:
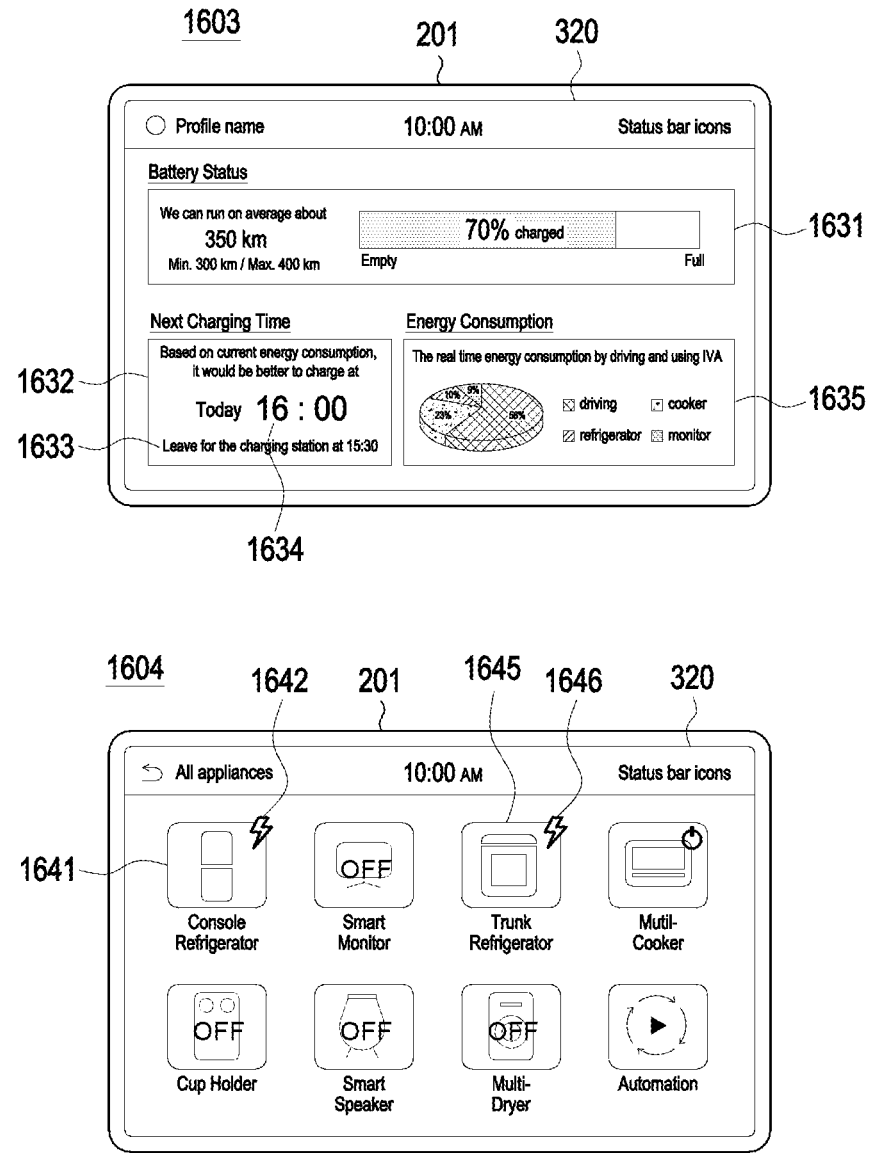
FIG. 16B is exemplary diagram for describing a method for providing information related to charging a vehicle battery by the first electronic device or the second electronic device according to various example embodiments.
Figure 16C:
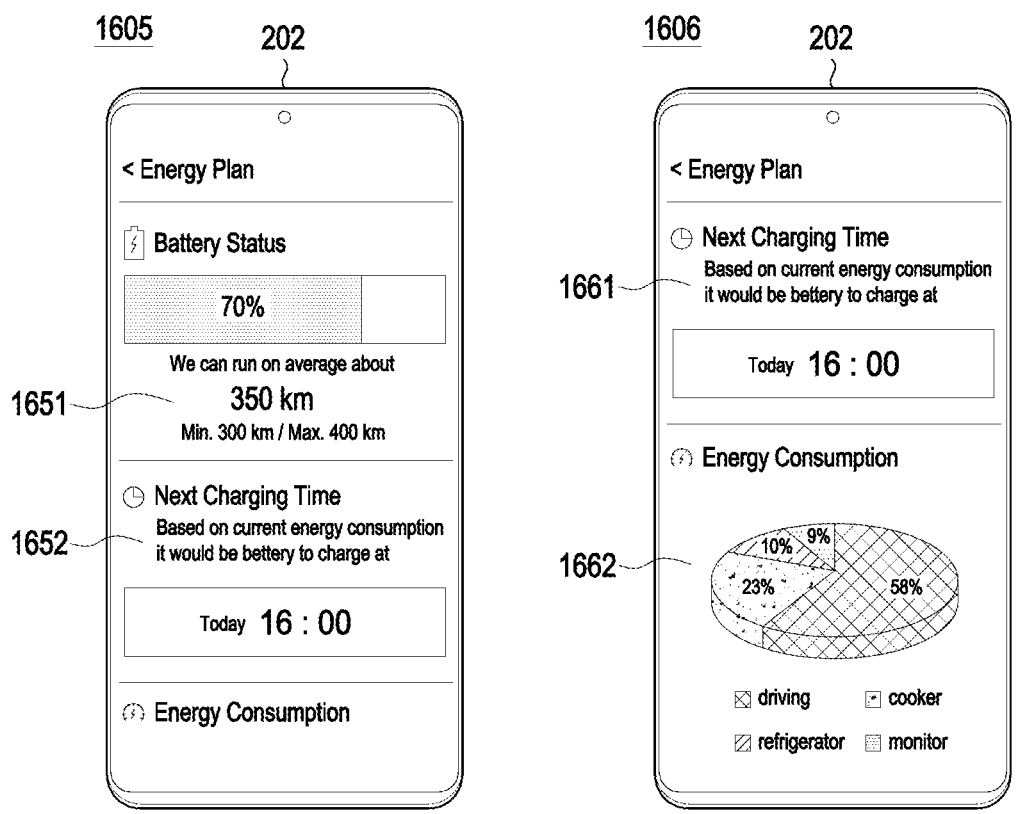
FIG. 16C is exemplary diagram for describing a method for providing information related to charging a vehicle battery by the first electronic device or the second electronic device according to various example embodiments.

FIG. 16A to FIG. 16C are exemplary diagrams for describing a method for providing information on charging of a vehicle battery by the first electronic device 201 or the second electronic device 202 according to various embodiments.

Referring to FIG. 16A to FIG. 16C, in an embodiment, as illustrated in reference numeral 1601, the processor 340 may display, via the display module 320, a page including information for controlling of at least one external electronic device. In reference numeral 1601, indicators 1611, 1612, and 1613 may indicate multiple pages, and the indicator 1611 may indicate a page currently being displayed in the first electronic device 201.

In an embodiment, in reference numeral 1602, the processor 340 may display, via the display module 320, a page which corresponds to the indicator 1612 and includes various menus, based on a user input (e.g., a swipe input to a screen in reference numeral 1601). In reference numeral 1602, a menu 1621 may be a menu for displaying information on charging of a vehicle battery.

In an embodiment, in reference numeral 1603, when a user input for the menu 1621 is received, the processor 340 may display information on charging of the vehicle battery, via the display module 320. For example, the processor 340 may display, via a first area 1631 of the display module 320, an average distance (e.g., 350 (km)), a minimum distance (e.g., 300 (km)), and a maximum distance (e.g., 400 (km)) that the vehicle is able to travel using a remaining battery level of the vehicle and a current remaining battery level (e.g., approximately 70% of a maximum battery level). The processor 340 may display, via a second area 1632 of the display module 320, a recommended time point 1634 for charging of the vehicle battery (e.g., 4:00 PM today) (e.g., a point in time at which the remaining battery level of the vehicle becomes equal to the amount of power required for traveling from a destination (e.g., a schedule place) to a charging station) and/or a recommended time point 1633 (e.g., 3:30 PM today) of departing from the destination to the charging station in order to charge the vehicle battery. The processor 340 may display, via a third area 1635 of the display module 320, a ratio (e.g., 58%) of power being used by the vehicle for traveling in a total power used by the vehicle battery, a ratio (e.g., 23%) of power being consumed by a cooker in the total power used by the vehicle battery, a ratio (e.g., 10%) of power being consumed by a refrigerator in the total power used by the vehicle battery, and a ratio (e.g., 9%) of power being consumed by a monitor in the total power used by the vehicle battery.

In an embodiment, when charging of the vehicle is not performed until the recommended time point (e.g., 4:00 PM today) for charging of the vehicle battery, the processor 340 may display, via the display module 320 (which comprises a display), information indicating that the vehicle needs to be charged, and may control at least one external electronic device to operate in a low-power mode. For example, as illustrated in reference numeral 1604, the processor 340 may control a console refrigerator and a trunk refrigerator to operate in the low-power mode, and may display objects 1642 and 1646, which indicate that the console refrigerator and the trunk refrigerator operate in the low-power mode, in an object 1641 indicating the console refrigerator and an object 1645 indicating the trunk refrigerator, respectively, via the display module 320. In an embodiment, even when charging of the vehicle is not performed until the recommended time point (e.g., 4:00 PM today) for charging of the vehicle battery, the processor 340 may maintain a current mode without switching a mode of at least one external electronic device to the low-power mode, according to a type and/or a current state of the at least one external electronic device. For example, when a user is currently using a multi-cooker for cooking, the processor 340 may maintain a current mode without switching a mode of the multi-cooker to the low-power mode.

In an embodiment, the processor 340 may transmit information on charging of the vehicle battery to the second electronic device 202 via the communication module 310 which comprises communication circuitry. The second electronic device 202 may display the information on charging of the vehicle battery, via the display module 420. For example, as illustrated in reference numeral 1605, the second electronic device 202 may display, via a first area 1651 of the display module 420, an average distance (e.g., 350 (km)), a minimum distance (e.g., 300 (km)), and a maximum distance (e.g., 400 (km)) that the vehicle is able to travel using a remaining battery level of the vehicle and a current remaining battery level (e.g., approximately 70% of a maximum battery level). The processor 440 may display a recommended time point (e.g., 4:00 PM today) for charging of the vehicle battery, via a second area 1652 of the display module 420. For another example, as illustrated in reference numeral 1606, the second electronic device 202 may display the recommended time point (e.g., 4:00 PM today) for charging of the vehicle battery, via a first area 1661 of the display module 420. The second electronic device 202 may display, via a second area 1662 of the display module 420, a ratio (e.g., 58%) of power being used by the vehicle for traveling in a total power used by the vehicle battery, a ratio (e.g., 23%) of power being consumed by a cooker in the total power used by the vehicle battery, a ratio (e.g., 10%) of power being consumed by a refrigerator in the total power used by the vehicle battery, and a ratio (e.g., 9%) of power being consumed by a monitor in the total power used by the vehicle battery.

Figure 17:
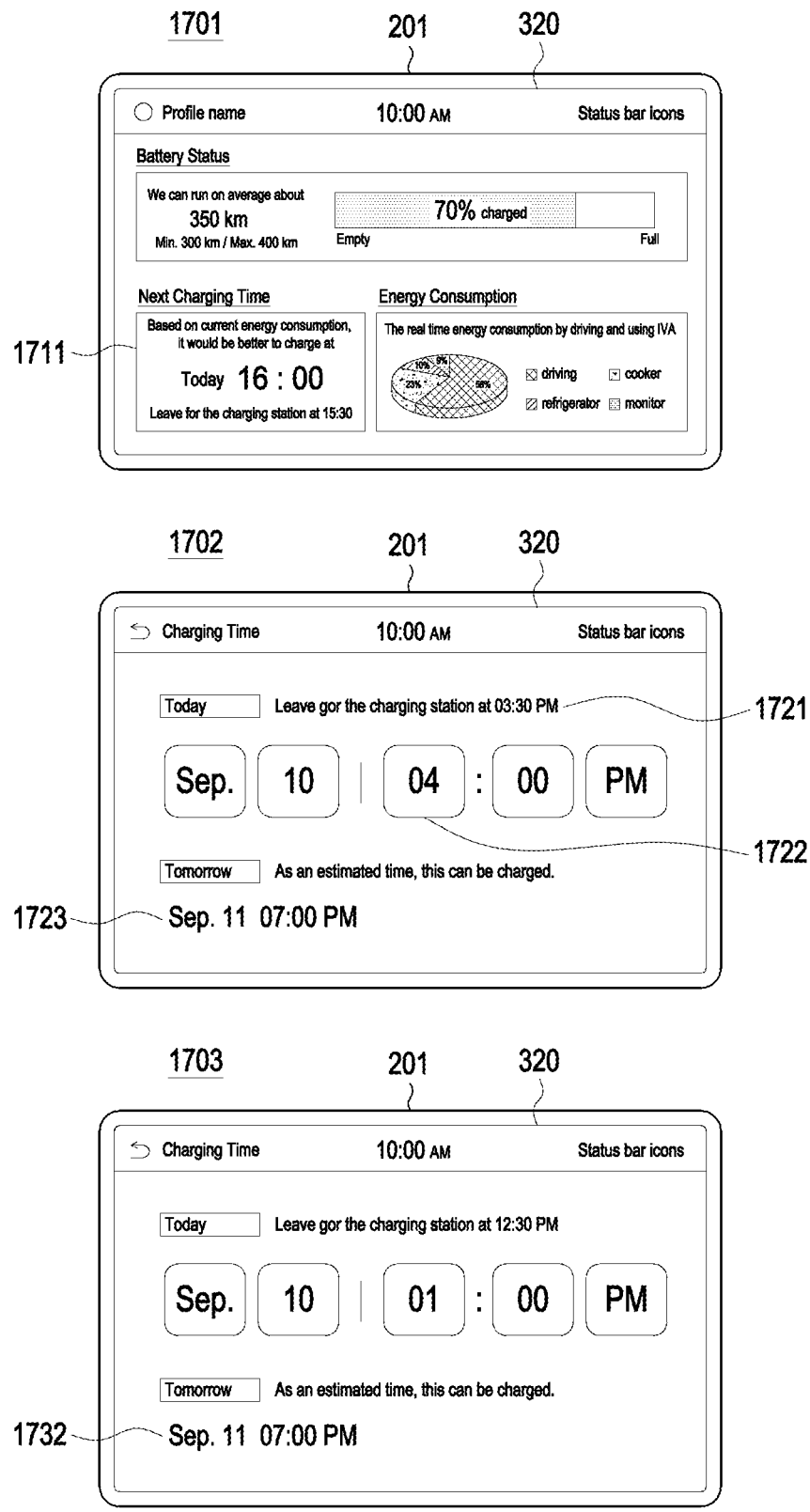
FIG. 17 is an exemplary diagram illustrating a method for providing a point in time when a vehicle battery is required to be charged, according to various example embodiments.

FIG. 17 is an exemplary diagram illustrating a method for providing a point in time when a vehicle battery is required to be charged, according to various embodiments.

Referring to FIG. 17, in an embodiment, in reference numeral 1701, the processor 340 may display information on charging of the vehicle battery, via the display module 320. For example, the processor 340 may display, via a first area 1711 of the display module 320, a recommended time point (e.g., 4:00 PM today) for charging of the vehicle battery and/or a recommended time point (e.g., 3:30 PM today) of departing from a destination to a charging station in order to charge the vehicle battery. In an embodiment, in reference numeral 1702, based on a user input to the first area 1711, the processor 340 may display, via the display module 320, a recommended time point 1721 (e.g., 3:30 PM today) of departing from the destination to the charging station in order to charge the vehicle battery, an object (e.g., object 1722) for adjusting of the recommended time point (e.g., 4:00 PM today) for charging of the vehicle battery, and a next recommended time point 1723 (e.g., 7:00 PM on September 11) (e.g., a point in time at which the remaining battery level of the vehicle becomes equal to the amount of power required for traveling from the destination (e.g., a schedule place) to the charging station after charging the vehicle battery at the recommended time point 1721) subsequent to the recommended time point 1721 of departing from the destination to the charging station in order to charge the vehicle battery.

In an embodiment, in reference numeral 1703, the processor 340 may adjust the recommended time point for charging of the vehicle battery, based on the user input for the object for adjustment of the recommended time point for charging of the vehicle battery. For example, as illustrated in reference numeral 1703, the processor 340 may adjust the recommended time point for charging of the vehicle battery from 4:00 PM today (September 10) to 1:00 PM today, based on the user input for the object for adjustment of the recommended time point for charging of the vehicle battery.

In an embodiment, when the recommended time point for charging of the vehicle battery has been adjusted, the processor 340 may acquire (e.g., calculate), based on the adjusted recommended time point for charging of the vehicle battery, a next recommended time point 1732 (e.g., 7 PM on September 11) subsequent to the adjusted recommended time point for charging of the vehicle battery, and may display, via the display module 320, the acquired next recommended time point 1732 (e.g., a point in time at which the remaining battery level of the vehicle becomes equal to the amount of power required for traveling from the destination (e.g., the schedule place) to the charging station after charging of the vehicle battery at the recommended time point.

Figure 18:
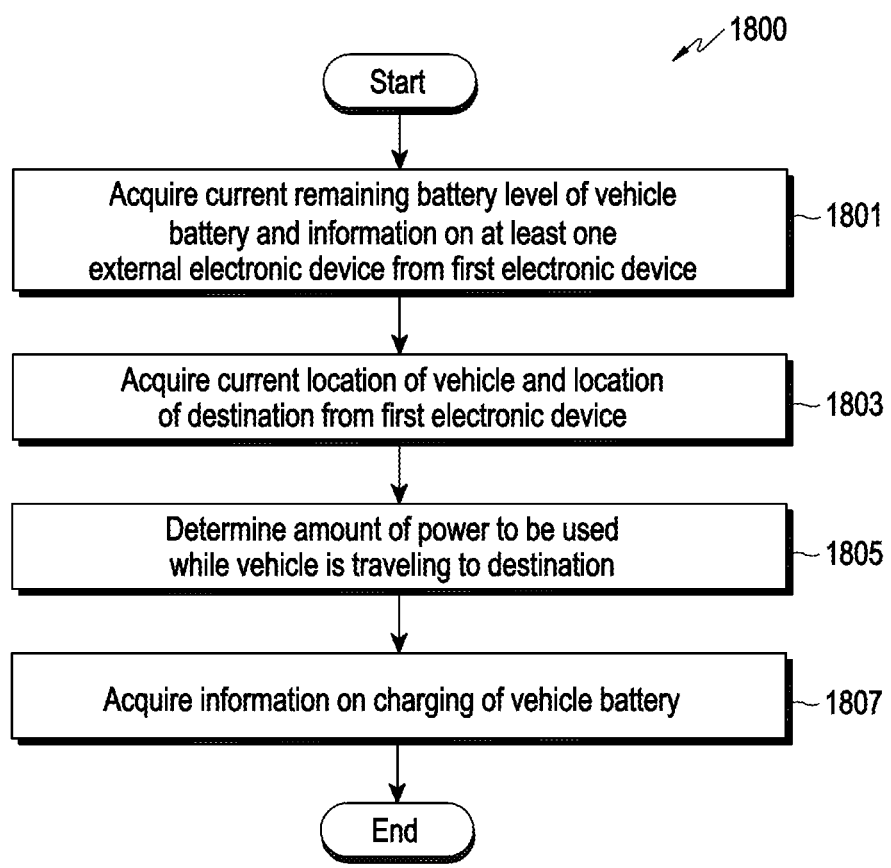
FIG. 18 is a flowchart illustrating a method for providing information related to charging a vehicle battery according to various example embodiments.

FIG. 18 is a flowchart 1800 illustrating a method for providing information on charging of a vehicle battery according to various embodiments.

In an embodiment, FIG. 18 may be a diagram for describing an operation performed by the server 203 to provide information on charging of a vehicle battery.

Referring to FIG. 18, in operation 1801, in an embodiment, the processor 530 of the server 203 may acquire a current remaining battery level of a vehicle battery and information on at least one external electronic device from the first electronic device 201 via the communication module 510.

In an embodiment, information on the at least one external electronic device may include a type (e.g., an identity (ID) of the at least one external electronic device), state (e.g., whether the at least one external electronic device is in an on/off state and whether the at least one external electronic device is in a lower power mode), and/or power consumption (e.g., currently used power and rated power consumption) of the at least one external electronic device.

In operation 1803, in an embodiment, the processor 530 may acquire a current location of the vehicle and a location of a destination from the first electronic device 201 via the communication module 510 which comprises communication circuitry. Each "module" herein may comprise circuitry.

In an embodiment, the processor 530 may receive, from the first electronic device 201 via the communication module 510, a route (e.g., a driving route of the vehicle) from the current location of the vehicle to the location of the destination, which is configured via a navigation application, based on the current location of the vehicle and the location of the destination.

In operation 1805, in an embodiment, the processor 530 may determine the amount of power to be used while the vehicle is traveling to the destination, based on information on the at least one external electronic device, the current location of the vehicle, and the location of the destination.

Operation 1805 is at least partially the same as or similar to operation 605 of FIG. 6, so that a detailed description thereof will be omitted.

In operation 1807, in an embodiment, the processor 530 may acquire information on charging of the vehicle battery, based on the current remaining battery level of the vehicle battery and the amount of power to be used while traveling from the current location to the destination.

In an embodiment, the processor 530 may transmit the acquired information on battery charging of the vehicle to the first electronic device 201 and/or the second electronic device via the communication module 510.

Operation 1807 is at least partially the same as or similar to operation 607 of FIG. 6, so that a detailed description thereof will be omitted.

FIG. 18 illustrates examples in which the server 203 performs at least some of the operations of the first electronic device 201, which are described in FIG. 6, but the disclosure is not limited thereto. For example, the server 203 may perform at least some of the operations of the first electronic device 201, which are described with reference to FIG. 7 to FIG. 16C as well as FIG. 6.

A method for providing information related to charging of a vehicle battery by an electronic device (e.g., the first electronic device 201) according to various embodiments may include acquiring a current remaining battery level of a battery of a vehicle 211, information on at least one external electronic device 221, 222, 223, 224, 225 and 226 operated by power provided from the battery, a current location of the vehicle, and a location of a destination to which the vehicle is to travel, determining an amount of power to be used while the vehicle travels to the destination, based on the information on the at least one external electronic device, the current location of the vehicle, and the location of the destination, and acquiring information related to charging of the battery, based on the current remaining battery level and the determined amount of power.

In various embodiments, the information on the at least one external electronic device may include a type, state, and/or power consumption of the at least one external electronic device.

In various embodiments, the at least one external electronic device may include one or more home appliances.

In various embodiments, the determining of the amount of power to be used while the vehicle travels to the destination may include determining the amount of power required for the vehicle to travel from the current location to the destination and the amount of power to be used by the at least one external electronic device while the vehicle travels from the current location to the destination, based on the information on the at least one external electronic device, the current location of the vehicle, and the location of the destination, and determining the amount of power to be used while the vehicle travels to the destination, by summing the amount of power required for the vehicle to travel from the current location to the destination and the amount of power to be used by the at least one external electronic device while the vehicle travels from the current location to the destination.

In various embodiments, the acquiring of the information on charging of the battery may include acquiring guidance information for charging the battery of the vehicle before the vehicle arrives at the destination if the determined amount of power is higher than the current remaining battery level, wherein the guidance information includes information on a charging station for charging the battery of the vehicle.

In various embodiments, the method may further include acquiring information on a schedule, and determining, based on past use data of the at least one external electronic device, the amount of power to be used by the at least one external electronic device during a schedule time determined based on the schedule, wherein the acquiring of the information related to the charging of the battery may include acquiring information related to the charging of the battery, based on the current remaining battery level, the amount of power to be used while the vehicle travels to the destination, and the amount of power to be used by the at least one external electronic device during the schedule time.

In various embodiments, the method may further include determining the amount of power to be used while the vehicle travels from the location of the destination to a charging station for charging the battery of the vehicle, wherein the acquiring of the information related to the charging of the battery includes acquiring information related to the charging of the battery, based on the current remaining battery level, the amount of power to be used while the vehicle travels to the destination, the amount of power to be used by the at least one external electronic device during the schedule time, and the amount of power to be used while the vehicle travels from the location of the destination to the charging station.

In various embodiments, the method may further include acquiring information on a schedule, determining, based on past use data of the at least one external electronic device, the amount of power to be used by the at least one external electronic device from a current time point to a point in time when the schedule is completed, and determining the amount of power to be used while the vehicle travels from the current location to a charging station for charging the battery of the vehicle, wherein the acquiring of the information related to the charging of the battery includes acquiring information related to the charging of the battery, based on the current remaining battery level, the amount of power to be used while the vehicle travels to the destination, the amount of power to be used by the at least one external electronic device from the current time point to the point in time when the schedule is completed, and the amount of power to be used while the vehicle travels from the location of the destination to the charging station.

In various embodiments, the acquiring of the information related to the charging of the battery may include acquiring a point in time when the battery of the vehicle needs to be charged and/or a point in time when the vehicle is to depart from the current location of the vehicle or the location of the destination to a location of a charging station for charging the battery of the vehicle in order to charge the battery of the vehicle.

The structure of data used in the aforementioned embodiment of the document may be recorded in a computer-readable recording medium via various means. The computer-readable recording medium includes a storage medium, such as a magnetic storage medium (e.g., a ROM, a floppy disk, a hard disk, etc.) and an optically readable medium (e.g., a CD-ROM, a DVD, etc.).

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device comprising:
memory storing instructions; and
at least one processor including processing circuitry, wherein the instructions, when executed by the at least one processor individually or collectively, cause the electronic device to:
acquire a current remaining battery level of a battery of a vehicle, information on at least one external electronic device operated by power provided from the battery, a current location of the vehicle, and a location of a destination to which the vehicle is to travel,
determine an amount of power to be used by the vehicle and the at least one external electronic device while the vehicle travels from the current location to the location of the destination, based on the information on the at least one external electronic device, the current location of the vehicle, and the location of the destination,
determine whether the battery of the vehicle needs to be charged before reaching the destination, based on the current remaining battery level and the determined amount of power, and
based on determining that the battery of the vehicle needs to be charged, output, through at least one of a display of the electronic device or a speaker of the electronic device, information indicating that the battery of the vehicle needs to be charged before reaching at the destination,
wherein the instructions, when executed by at least one processor individually or collectively, cause, to determine the amount of power to be used by the vehicle and the at least one external electronic device, the electronic device to:
determine, using a navigation application, a distance between the current location and the location of the destination and a driving time required for the vehicle to travel from the current location to the location of the destination, based on the determined distance and an average fuel efficiency of the vehicle, determine an amount of power required for the vehicle to travel from the current location to the destination without the at least one external electronic device using the battery, based on the determined driving time and power consumption of the at least one external electronic device, determine an amount of power to be used by the at least one external electronic device, and based on the amount of the power required for the vehicle to travel from the current location to the destination without the at least one external electronic device using the battery and the amount of the power to be used by the at least one external electronic device, determine the amount of power to be used by the vehicle and the at least one external electronic device while the vehicle travels from the current location to the location of the destination.

2. The electronic device of claim 1, wherein the information on the at least one external electronic device comprises at least one of: a type, state, or power consumption of the at least one external electronic device.

3. The electronic device of claim 1, wherein the at least one external electronic device comprises one or more detachable appliances disposed in the vehicle.

4. The electronic device of claim 1, wherein the instructions, when executed by at least one processor individually or collectively, further cause the electronic device to:

based on the determined amount of power being higher than the current remaining battery level, acquire guidance information for charging the battery of the vehicle before the vehicle reaches at the destination, wherein the guidance information comprises information on a charging station for charging the battery of the vehicle.

5. The electronic device of claim 1, wherein the instructions, when executed by at least one processor individually or collectively, further cause the electronic device to:

acquire information regarding a schedule, and based on past use data of the at least one external electronic device, determine the amount of power to be used by the at least one external electronic device during a schedule time determined based on the schedule, and wherein the amount of the power to be used by the at least one external electronic device while the vehicle travels from the current location to the location of the destination based on the amount of power to be used by the at least one external electronic device during the schedule time.

6. The electronic device of claim 5, wherein the instructions, when executed by at least one processor individually or collectively, further cause the electronic device to determine the amount of power to be used by the vehicle and the at least one external electronic device while the vehicle travels between the location of the destination and a location of a charging station for charging of the battery of the vehicle, and wherein whether the battery of the vehicle needs to be charged before reaching the destination is determined, based on the current remaining battery level, the amount of power to be used by the vehicle and the at least one external electronic device while the vehicle travels from the current location to the location of the destination, the amount of power to be used by the at least one external electronic device during the schedule time, and the amount of power to be used by the vehicle and the at least one external electronic device while the vehicle travels between the location of the destination and the location of the charging station.

7. The electronic device of claim 1, wherein the instructions, when executed by at least one processor individually or collectively, further cause the electronic device to:

acquire information regarding a schedule, based on past use data of the at least one external electronic device, determine the amount of power to be used by the at least one external electronic device from a current time point to a point in time when the schedule is completed, and determine the amount of power to be used by the vehicle and the at least one external electronic device while the vehicle travels from the current location to a location of a charging station for charging the battery of the vehicle, and wherein whether the battery of the vehicle needs to be charged before reaching the destination is determined, based on the current remaining battery level, the amount of power to be used by the vehicle and the at least one external electronic device while the vehicle travels from the current location to the location of the destination, the amount of power to be used by the at least one external electronic device from the current time point to the point in time when the schedule is completed, and the amount of power to be used by the vehicle and the at least one external electronic device while the vehicle travels between the location of the destination and to the location of the charging station.

8. The electronic device of claim 1, wherein the instructions, when executed by at least one processor individually or collectively, further cause the electronic device to:

acquire a point in time when the vehicle is to depart from the current location of the vehicle or the location of the destination to a location of a charging station for charging the battery of the vehicle in order to charge the battery of the vehicle.

9. A method for providing information related to charging of a vehicle battery by an electronic device, the method comprising:

acquiring a current remaining battery level of a battery of a vehicle, information on at least one external electronic device operated by power provided from the battery, a current location of the vehicle, and a location of a destination to which the vehicle is to travel;

determining an amount of power to be used by the vehicle and the at least one external electronic device while the vehicle travels from the current location to the location of the destination, based on the information on the at least one external electronic device, the current location of the vehicle, and the location of the destination;

determining whether the battery of the vehicle needs to be charged before reaching the destination, based on the current remaining battery level and the determined amount of power; and based on determining that the battery of the vehicle needs to be charged, outputting, through at least one of a display of the electronic device or a speaker of the electronic device, information indicating that the battery of the vehicle needs to be charged before reaching at the destination, wherein determining the amount of the power to be used by the vehicle and the at least one external electronic device while the vehicle travels from the current location to the location of the destination comprises:
determining, using a navigation application, a distance between the current location and the location of the destination and a driving time required for the vehicle to travel from the current location to the location of the destination,
based on the determined distance and an average fuel efficiency of the vehicle, determining an amount of power required for the vehicle to travel from the current location to the destination without the at least one external electronic device using the battery,
based on the determined driving time and power consumption of the at least one external electronic device, determining an amount of power to be used by the at least one external electronic device, and
based on the amount of the power required for the vehicle to travel from the current location to the destination without the at least one external electronic device using the battery and the amount of the power to be used by the at least one external electronic device, determining the amount of power to be used by the vehicle and the at least one external electronic device while the vehicle travels from the current location to the location of the destination.

10. The method of claim 9, wherein the information on the at least one external electronic device comprises at least one of: a type, state, or power consumption of the at least one external electronic device.

11. The method of claim 9, wherein the at least one external electronic device comprises one or more detachable appliances disposed in the vehicle.

12. The method of claim 9, further comprising:
based on the determined amount of power being higher than the current remaining battery level, acquiring guidance information for charging the battery of the vehicle before the vehicle reaches at the destination,
wherein the guidance information comprises information on a charging station for charging the battery of the vehicle.

13. The method of claim 9, further comprising:
acquiring information regarding a schedule; and
based on past use data of the at least one external electronic device, determining the amount of power to be used by the at least one external electronic device during a schedule time determined based on the schedule,
wherein the amount of the power to be used by the at least one external electronic device while the vehicle travels from the current location to the location of the destination based on the amount of power to be used by the at least one external electronic device during the schedule time.

14. The method of claim 13, further comprising determining the amount of power to be used by the vehicle and the at least one external electronic device while the vehicle travels between the location of the destination and a location of a charging station for charging the battery of the vehicle,
wherein whether the battery of the vehicle needs to be charged before reaching the destination is determined, based on the current remaining battery level, the amount of power to be used by the vehicle and the at least one external electronic device while the vehicle travels from the current location to the location of the destination, the amount of power to be used by the at least one external electronic device during the schedule time, and the amount of power to be used by the vehicle and the at least one external electronic device while the vehicle travels between the location of the destination and the location of the charging station.

15. The method of claim 9, further comprising:
acquiring information regarding a schedule;
based on past use data of the at least one external electronic device, determining the amount of power to be used by the at least one external electronic device from a current time point to a point in time when the schedule is completed; and
determining the amount of power to be used by the vehicle and the at least one external electronic device while the vehicle travels from the current location to a location of a charging station for charging the battery of the vehicle,
wherein whether the battery of the vehicle needs to be charged before reaching the destination is determined, based on the current remaining battery level, the amount of power to be used by the vehicle and the at least one external electronic device while the vehicle travels from the current location to the location of the destination, the amount of power to be used by the at least one external electronic device from the current time point to the point in time when the schedule is completed, and the amount of power to be used by the vehicle and the at least one external electronic device while the vehicle travels between the location of the destination to the location of the charging station.

16. The method of claim 9, further comprising acquiring a point in time when the vehicle is to depart from the current location of the vehicle or the location of the destination to a location of a charging station for charging the battery of the vehicle in order to charge the battery of the vehicle.

* * * * *